United States Patent [19]
Yamashita et al.

[11] Patent Number: 5,808,664
[45] Date of Patent: Sep. 15, 1998

[54] METHOD OF CONVERTING TWO-DIMENSIONAL IMAGES INTO THREE-DIMENSIONAL IMAGES

[75] Inventors: Shugo Yamashita, Osaka; Toshiyuki Okino, Kadoma; Haruhiko Murata, Takatsuki; Toshiya Iinuma, Moriguchi; Yukio Mori, Kadoma; Seiji Okada, Moriguchi, all of Japan

[73] Assignee: Sanyo Electric Co., Ltd., Osaka, Japan

[21] Appl. No.: 500,620

[22] Filed: Jul. 11, 1995

[30] Foreign Application Priority Data

| Jul. 14, 1994 | [JP] | Japan | 6-162260 |
| Sep. 22, 1994 | [JP] | Japan | 6-228186 |
| May 30, 1995 | [JP] | Japan | 7-132437 |

[51] Int. Cl.$^6$ .................................................. H04N 13/00
[52] U.S. Cl. ........................... 348/42; 348/43; 348/44; 348/49; 348/50; 348/700
[58] Field of Search .................... 348/42, 43, 44, 348/49, 56, 50, 169, 170, 416, 420, 700

[56] References Cited

U.S. PATENT DOCUMENTS

| 4,272,783 | 6/1981 | Warnstam et al. | 348/170 |
| 4,562,463 | 12/1985 | Lipton | 348/56 |
| 4,636,862 | 1/1987 | Hatori et al. | 348/420 |
| 4,689,673 | 8/1987 | Ohki et al. | . |
| 4,754,327 | 6/1988 | Lippert | 348/50 |
| 4,807,024 | 2/1989 | McLaurin et al. | . |
| 4,994,898 | 2/1991 | Ling et al. | 348/44 |
| 5,220,421 | 6/1993 | Chaissaing et al. | 348/42 |
| 5,473,369 | 12/1995 | Abe | 348/169 |
| 5,510,832 | 4/1996 | Garcia | 348/56 |

FOREIGN PATENT DOCUMENTS

| 2 654 291 | 5/1991 | France . |
| 2 158 324 | 11/1985 | United Kingdom . |

*Primary Examiner*—Howard W. Britton
*Assistant Examiner*—Frank Snow
*Attorney, Agent, or Firm*—Nikaido, Marmelstein, Murray & Oram LLP

[57] ABSTRACT

A method of converting two-dimensional images into three-dimensional images by producing from a two-dimensional image signal a first image signal which forms a basis and a second image signal delayed by a predetermined number of fields from the first image signal and taking one of the signals as a left eye image signal and the other as a right eye image signal. It is judged whether or not a scene represented by the two-dimensional image signal is changed. When it is judged that the scene is changed, delay indicating how many fields are there from a field corresponding to the first image signal to a field corresponding to the second image signal is set to a predetermined value, for example, zero.

31 Claims, 18 Drawing Sheets

METHOD OF CONVERTING TWO-DIMENSIONAL IMAGES INTO THREE-DIMENSIONAL IMAGES

BACKGROUND OF THE INVENTION

1. Field of the Invention

The present invention relates to a method of converting two-dimensional (2D) images outputted from a VTR (Video Tape Recorder), a video camera or the like and transmitted by a CATV (Cable Television) and TV broadcasting into three-dimensional (3D) images.

2. Description of the Prior Art

Almost all types of 3D image software used for a 3D image display system which has been recently in the news are particularly produced for displaying 3D images. The image software for displaying 3D images is generally produced by picking up a right eye image and a left eye image using two cameras.

The left and right images recorded on the 3D image software are displayed on a display almost simultaneously. The left eye image and the right eye image reflected almost simultaneously are respectively incident on the left eye and the right eye of a viewer, whereby the viewer recognizes the 3D images.

However, a lot of types of image software produced by 2D images exist in the world, while the number of types of 3D image software is very small, whereby 3D image software must be newly produced so as to display the 3D images, which takes much time and labor and increases the cost.

Therefore, a method of converting 2D images into 3D images has been already proposed. Examples of the method of converting 2D images into 3D images include the following. Specifically, in the case of a 2D image on which an object moving from the left to the right, for example, is reflected, the original 2D image is taken as a left eye image, and an image constituting a field which is several fields preceding the left eye image is taken as a right eye image. Consequently, parallax occurs between the left eye image and the right eye image. Therefore, both the images are displayed on a screen almost simultaneously so that the moving object is so recognized that it is raised forward against a background.

In the method of converting 2D images into 3D images by field delay as described above, however, when a scene currently reflected is changed to an entirely different scene, a new scene is reflected on the left eye image, while the preceding scene is reflected on the right eye image obtained by the field delay, whereby the images representing the entire different scenes are incident on the left eye and the right eye of the viewer, so that the viewer feels uncomfortable.

SUMMARY OF THE INVENTION

The present invention has been made in view of the disadvantages of the prior art and has for its object to provide a method of converting 2D images into 3D images in which at a change point where a scene currently reflected is changed to an entirely different scene, images representing entirely different scenes can be prevented from being incident on the left eye and the right eye of a viewer, thereby to make it possible for a viewer to view a 3D image without feeling uncomfortable.

In a method of converting 2D images into 3D images by producing from a 2D image signal a first image signal which forms a basis and a second image signal delayed by a predetermined number of fields from the first image signal and taking one of the signals as a left eye image signal and the other signal as a right eye image signal, a method of converting 2D images into 3D images according to the present invention is characterized by comprising a first step of judging whether or not a scene represented by the 2D image signal is changed, and a second step of taking delay indicating how many fields are there from a field corresponding to the first image signal to a field corresponding to the second image signal as a predetermined value, for example, zero when it is judged that the scene is changed.

In the first step, it is judged whether or not the scene is changed on the basis of a value related to a motion vector detected for each field in the 2D image signal. For example, it is judged that the scene is changed when a value related to a motion vector detected in a certain field in the 2D image signal is larger by not less than a predetermined value than values related to motion vectors detected in fields preceding and succeeding the certain field.

Specifically, if the scene is changed, the contents of the image are greatly changed, whereby an object and a background which were reflected before the scene is changed disappear and greatly move. Therefore, a field where a motion vector is rapidly increased with respect to fields preceding and succeeding the 2D image signal is searched for, thereby to make it possible to satisfactorily judge the change of the scene.

A plurality of motion vector detecting areas may be set in one field in the 2D image signal, to use the sum of values related to motion vectors detected for the motion vector detecting areas in each of fields as a value related to the motion vector detected in the field.

In a case where a value related to a motion vector detected in the t-th field in the 2D image signal is taken as MX(t), and the average value of values related to motion vectors detected in a predetermined number of fields preceding a field which is two fields preceding the t-th field is taken as MXave(t−2), it may be judged that the scene is changed in the (t−1)-th field when the following expression (4) is satisfied:

$$MX(t-1) >> MXave(t-2) \cap MX(t-1) >> MX(t) \qquad (4)$$

A plurality of motion vector detecting areas may be set in one field in the 2D image signal, to find a value MX(t) related to a motion vector detected in the t-th field on the basis of the following equation (5):

$$MX(t) = \sum_{i=1}^{Nx} \sum_{j=1}^{Ny} | \overrightarrow{M_{ij}(t)} \cdot \overrightarrow{ex} | \qquad (5)$$

Nx: the number of motion vector detecting areas in the transverse direction of a screen Ny: the number of motion vector detecting areas in the longitudinal direction of the screen $\overrightarrow{M_{ij}(t)}$: a motion vector in the t-th field $\overrightarrow{ex}$: a unit vector in the transverse direction In a case where a value related to a motion vector detected in a certain field in the 2D image signal is larger by not less than a predetermined value than the average value of values related to motion vectors respectively detected in several fields preceding the certain field and is larger by not less than a predetermined value than a value related to a motion vector detected in a field which is one field succeeding the certain field, it may be judged that the scene is changed.

In this case, the average value MXave(t) of values related to motion vectors respectively detected in several fields preceding the t-th field is represented by the following equation (6):

$$MXave(t) = \frac{1}{S} \cdot \sum_{k=1}^{S} MX(t+1-k) \qquad (6)$$

S: the number of fields for finding the average value

MX(t+1−k) : the sum of values related to motion vectors in the (t+1−k)-th field

In a case where it is judged that the scene is changed, it is preferable to erase values related to motion vectors in fields preceding a field where the scene is changed which have been stored.

As the first step, one comprising the steps of finding a luminance level for each field in the 2D image signal, judging whether or not the amount of the change in the luminance level between fields in the 2D image signal is larger than a predetermined value, and judging that the scene is changed when it is judged that the amount of the change in the luminance level between the fields is larger than the predetermined value may be used.

As the first step, one comprising the steps of finding a chrominance level for each field in the 2D image signal, judging whether or not the amount of the change in the chrominance level between fields in the 2D image signal is larger than a predetermined value, and judging that the scene is changed when it is judged that the amount of the change in the chrominance level between the fields is larger than the predetermined value may be used.

As the first step, one comprising the steps of counting the number of horizontal synchronizing signals included in the 2D image signal every time a vertical synchronizing signal is extracted from the 2D image signal until the succeeding vertical synchronizing signal is extracted, judging whether or not asynchronization occurs in the 2D image signal on the basis of the number of horizontal synchronizing signals obtained, and judging that the scene is changed when it is judged that asynchronization occurs in the 2D image signal may be used.

In a case where the 2D image signal is a television broadcasting signal, the first step is the step of judging that the scene is changed when a channel switching signal produced when a television channel is switched is detected.

As the first step, one of judging that the scene is changed when a source switching signal produced when a source of the 2D image signal is switched is detected may be used.

Even in a case where the 2D image signal is a telecine converted image signal, it is judged whether or not the scene is changed on the basis of a value related to a motion vector detected for each field in the telecine converted image signal. As a value related to a motion vector, the minimum value of accumulated correlation values obtained at the time of detecting a motion vector by a representative point matching method, for example, is used.

It may be judged whether or not the scene is changed on the basis of a value related to a motion vector detected in a field where a frame of a cinema film (hereinafter referred to as a frame) is changed in the telecine converted image signal.

For example, in a case where a value related to a motion vector detected in a predetermined field where a frame is changed in the telecine converted image signal is larger by not less than a predetermined value than a value related to a motion vector detected in a field where a frame which is one frame preceding the frame changed in the predetermined field is changed, it is judged that the scene is changed in the predetermined field.

Furthermore, in a case where a value related to a motion vector detected in a predetermined field where a frame is changed in the telecine converted image signal is larger by not less than a predetermined value than a value related to a motion vector detected in a field where a frame which is one frame preceding the frame changed in the predetermined field is changed and a value related to a motion vector detected in a field where a frame which is two frames preceding the frame changed in the predetermined field is changed, it is judged that the scene is changed in the predetermined field.

Additionally, in a case where a value related to a motion vector detected in a predetermined field where a frame is changed in the telecine converted image signal is larger by not less than a predetermined value than a value related to a motion vector detected in a field where a frame which is one frame preceding the frame changed in the predetermined field is changed and a value related to a motion vector detected in a field where a frame which is two frames preceding the frame changed in the predetermined field is changed, and the absolute value of the difference between the value related to the motion vector detected in the predetermined field where the frame is changed and the value related to the motion vector detected in the field where the frame which is one frame preceding the frame changed in the predetermined field is changed is not less than the absolute value of the difference between the value related to the motion vector detected in the field where the frame which is one frame preceding the frame changed in the predetermined field is changed and the value related to the motion vector detected in the field where the frame which is two frames preceding the frame changed in the predetermined field is changed, it is judged that the scene is changed in the predetermined field.

In a case where the 2D image signal is a telecine converted image signal, it may be judged whether or not the scene is changed on the basis of the value related to the motion vector detected in the field where the frame is changed in the telecine converted image signal and at the same time, the following judgment of the change of the scene may be made.

Specifically, in a case where a value related to a motion vector detected in a second predetermined field which is one field preceding the current field in the telecine converted image signal is larger by not less than a predetermined value than a value related to a motion vector detected in the current field and is larger by not less than a predetermined value than a value related to a motion vector detected in a field which is one field preceding the second predetermined field, when the value related to the motion vector detected in the second predetermined field is larger by not less than a predetermined value than a value related to a motion vector detected in each of fields succeeding the second predetermined field over fields up to a field where a frame is thereafter changed in the telecine converted image signal, it is judged that the scene is changed in the second predetermined field.

According to the present invention, when the scene represented by the original 2D image signal is changed, it is possible to prevent images respectively representing different scenes from being incident on the left eye and the right eye of the viewer. Therefore, the viewer can view the 3D image satisfactorily without feeling uncomfortable.

According to the present invention, the image in which the value related to the motion vector is rapidly increased is detected, thereby to make it possible to judge whether or not the scene is changed with high precision.

According to the present invention, the magnitude of the motion vector is detected from the sum of the values related to the motion vectors detected in the plurality of areas of the screen, thereby to make it possible to detect the motion vector uniformly over the screen.

Furthermore, the motion vector in the preceding field is found from the average value of the values related to the motion vectors in the plurality of fields, whereby it is possible to almost ignore, if an error occurs in the detected value related to the motion vector in the certain field, the value, thereby to make it possible to satisfactorily judge the change of the scene.

According to the present invention, when it is judged that the scene is changed, information concerning an image before the change of the scene is erased, thereby to make it possible to satisfactorily judge the scene without being affected by information concerning an image representing the preceding scene when the change of the succeeding scene is judged.

According to the present invention, when the television channel is switched in a case where the original 2D image signal is a television broadcasting signal, it is possible to prevent the entirely different images before and after switching of the channel from being incident on the left eye and the right eye of the viewer. Therefore, the viewer can view a good 3D image without feeling uncomfortable.

According to the present invention, when the source of the original 2D image signal is switched, it is possible to prevent the entire different images before and after switching of the source from being incident on the left eye and the right eye of the viewer. Therefore, the viewer can view a good 3D image without feeling uncomfortable.

According to the present invention, even in a case where the original 2D image signal is a telecine converted image signal, it is possible to prevent images representing different scenes from being respectively incident on the left eye and the right eye of the viewer when the scene represented by the telecine converted image is changed. As a result, the viewer can view the 3D image satisfactorily without feeling uncomfortable.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
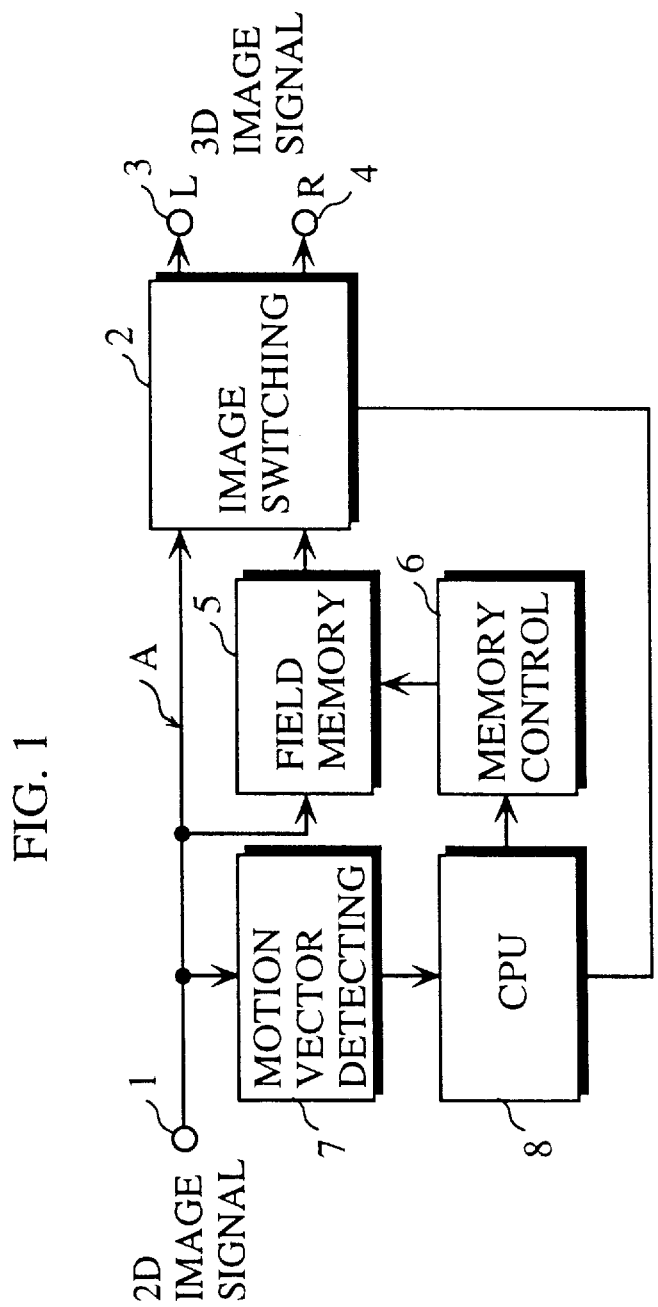
FIG. 1 is a block diagram showing the schematic construction of a 2D/3D image converter according to a first embodiment of the present invention.

Referring now to the drawings, embodiments of the present invention will be described in detail.

(1) DESCRIPTION OF FIRST EMBODIMENT

Figure 2:
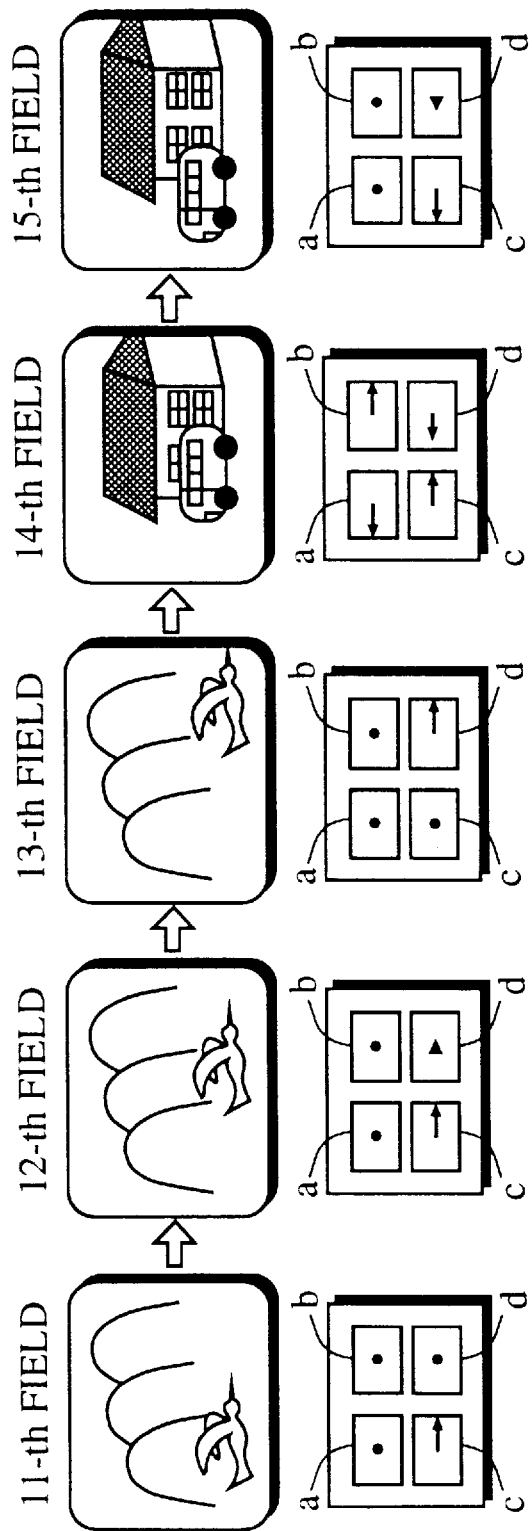
FIG. 2 is a diagram showing the change of a scene represented by the original 2D image.
Figure 3:
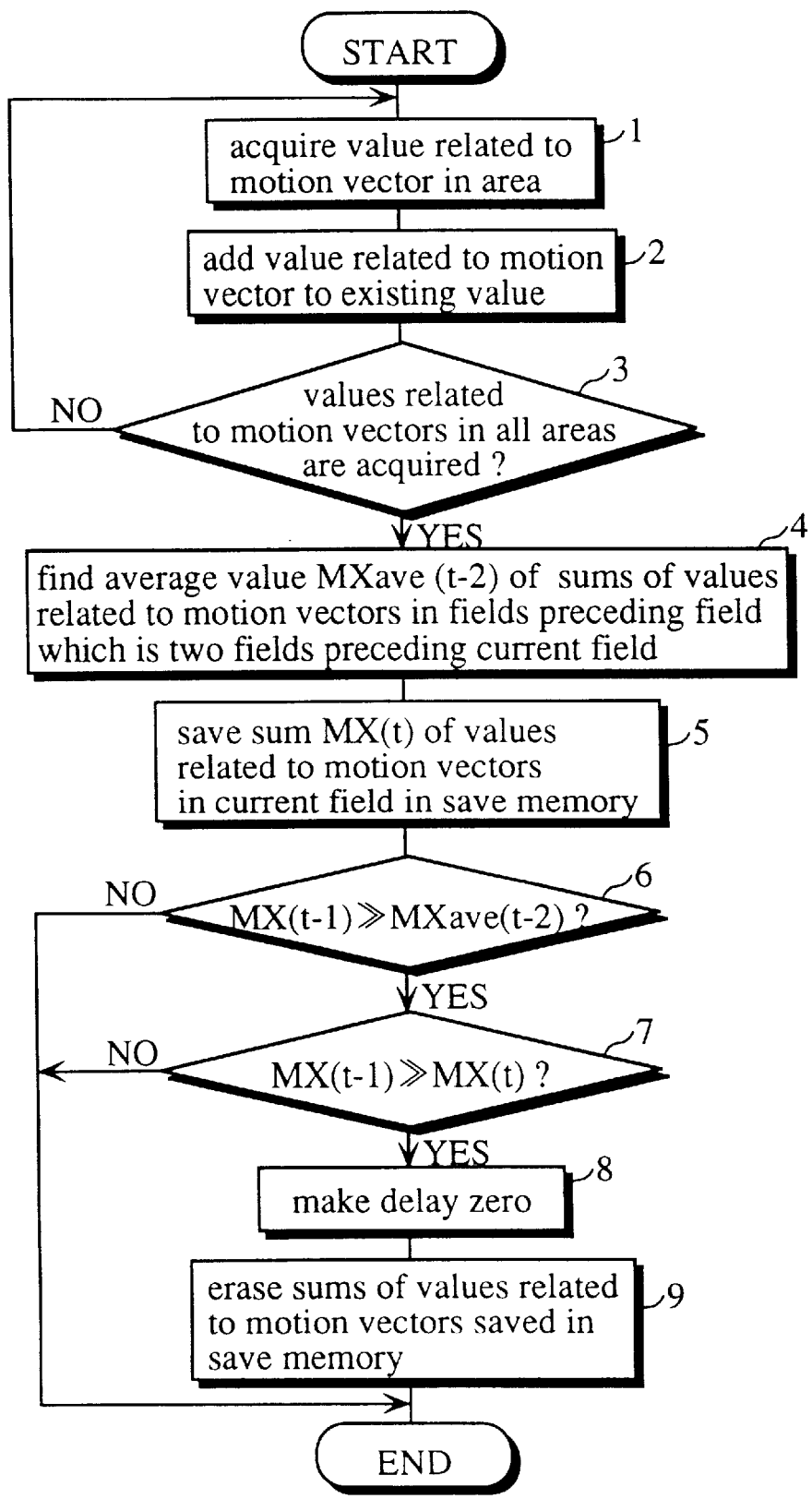
FIG. 3 is a flow chart showing the procedure for scene change detecting processing by a CPU.

Referring to FIGS. 1 to 3, a first embodiment of the present invention will be described.

FIG. 1 illustrates the construction of a 2D/3D image converter for converting 2D images into 3D images.

In the 2D/3D image converter, a normal 2D image signal for displaying a 2D image is inputted to an input terminal 1. The 2D image signal inputted from the input terminal 1 is supplied to an image switching circuit 2 and a field memory 5.

The field memory 5 delays the inputted 2D image signal by a predetermined number of fields and outputs the delayed 2D image signal, to supply the 2D image signal to the image switching circuit 2. Delay indicating how many fields are there from a field corresponding to the inputted 2D image signal to a field corresponding to the delayed 2D image signal is variably controlled for each field by a memory control circuit 6. In addition, the variable control may be carried out even in units of not more than one field.

The image switching circuit 2 is connected to an output terminal 3 for outputting a left eye image signal L and an output terminal 4 for outputting a right eye image signal R, and is so controlled that the output state is switched depending on the direction of the movement of an object.

Furthermore, the 2D image signal inputted from the input terminal 1 is supplied to a motion vector detecting circuit 7. In the motion vector detecting circuit 7, a motion vector corresponding to the movement between fields of an image is detected, and then is supplied to a CPU 8.

The CPU 8 extracts a horizontal component of the detected motion vector, and controls the memory control circuit 6 in accordance with the horizontal component.

Specifically, the memory control circuit 6 is so controlled that the delay is reduced when the object greatly moves and the motion vector is large, while being so controlled that the delay is increased when the object slightly moves or the motion vector is small as at the time of slow-motion reproduction.

Furthermore, the CPU 8 so controls the image switching circuit 2 that the delayed image signal is taken as a right eye image signal when the direction of the motion vector is from the left to the right, while being taken as a left eye image signal when the direction of the motion vector is from the right to the left.

With respect to such a scene that the object horizontally moves in the 2D image signal, therefore, parallax corresponding to the speed of the movement occurs.

A viewer can view a 3D image with a 3D effect by supplying left and right image signals from the output terminals 3 and 4 to a display for displaying 3D images such as a display by a lenticular method.

FIG. 2 is a diagram typically showing images respectively constituting five fields from the 11-th field to the 15-th field which are composed of the 2D image signal inputted to the input terminal 1, and the magnitude and the direction of motion vectors in each of the images. In FIG. 2, the images respectively constituting the three fields, that is, the 11-th field, the 12-th field and the 13-th field represent a scene on which a bird is flying from the left to the right, and the images respectively constituting the two fields, that is, the 14-th field and the 15-th field represent a scene on which a bus is running from the right to the left. Specifically, the image constituting the 13-th field and the image constituting the 14-th field represent entirely different scenes, whereby there is a scene change, that is, a change point of scenes therebetween.

In the first embodiment, the motion vector detecting circuit 7 detects a motion vector at a representative point (a center point) in each of four motion vector detecting areas a, b, c and d as shown in FIG. 2 of an image constituting one field (a representative point matching method).

FIG. 3 shows the procedure for scene change detecting processing performed for each field by the CPU 8.

In FIG. 3, the magnitude of a motion vector in the horizontal direction (hereinafter referred to a value related to a motion vector) in the area a in the current field is acquired by the motion vector detecting circuit 7 in the step 1, and the value related to the motion vector detected in the step 1 is added to the existing value in the step 2. The existing value is an initial value, that is, zero, and a value obtained by the addition becomes the value related to the motion vector in the area a.

In the step 3, it is then examined whether or not values related to the motion vectors in all the areas a, b, c and d in the image constituting the current field are acquired. When the values related to the motion vectors in all the areas are not acquired, the program is returned to the step 1.

The value related to the motion vector is acquired with respect to the area b where the value related to the motion vector is not acquired in the step 1, and the value related to the motion vector is added to the existing value in the step 2. That is, the sum of the value related to the motion vector in the area a and the value related to the motion vector in the area b is obtained in the step 2.

It is examined in the step 3 whether or not the values of the motion vectors in all the areas a, b, c and d in the image constituting the current field, after which the steps 1, 2 and 3 are repeated until the values related to the motion vectors in all the areas are acquired, thereby to finally obtain the sum of the values related to the motion vectors in all the areas a, b, c and d in the image constituting the current field in the step 2. The sum of the values related to the motion vectors in a case where the current field is the t-th field (t is a natural number) is taken as MX(t) and is defined by the following equation (7):

$$MX(t) = \sum_{i=1}^{Nx} \sum_{j=1}^{Ny} | \overrightarrow{M_{ij}(t)} \cdot \vec{ex} | \qquad (7)$$

Nx: the number of motion vector detecting areas in the transverse direction of a screen Ny: the number of motion vector detecting areas in the longitudinal direction of the screen $\overrightarrow{M_{ij}(t)}$: a motion vector in the t-th field $\vec{ex}$: a unit vector in the transverse direction Where Nx=2 and Ny=2 in the present embodiment.

When it is then judged in the step 3 that the values related to the motion vectors in all the areas a, b, c and d in the image constituting the current field are acquired, the average value of the sum of values related to motion vectors in fields preceding a field which is two fields preceding the current field, that is, the average value MXave(t–2) of the sum MX(t–3) of values related to motion vectors in a field which is three fields preceding the current field and the sum MX(t–2) of values related to motion vectors in a field which is two fields preceding the current field is found. MXave(t) is defined in the following equation (8):

$$MXave(t) = \frac{1}{S} \cdot \sum_{k=1}^{S} MX(t+1-k) \qquad (8)$$

S: the number of fields for finding the average value

MX(t+1–k): the sum of values related to motion vectors in the (t+1–k)-th field where S=2 in the present embodiment. Although in the present embodiment, description was made of a case where the average value of the sums of the values related to the motion vectors in two fields, that is, the field which is two fields preceding the current field and the field which is three fields preceding the current field is found for simplicity of illustration, the average value of the sums of values related to motion vectors in two or more fields, for example, 8 fields (S=8) from the field which is two fields preceding the current field to a field which is nine fields preceding the current field is actually found.

In the step 5, the sum MX(t) of the values related to the motion vectors in the current field obtained in the foregoing step 2 is stored in a save memory. The sum of values related to motion vectors for each field is stored with respect to images respectively constituting fields preceding a field which is several fields preceding the current field in the save memory.

It is then judged in the step 6 whether or not the sum MX(t–1) of values related to motion vectors in a field which is one field preceding the current field which is stored in the save memory is much larger than the average value MXave(t–2) obtained in the step 4 (for example, there is a difference of not less than 40 pixels). When it is judged that the sum MX(t–1) is not much larger than the average value MXave(t–2) (No in step 6), the CPU 8 terminates an operation in the current field. On the other hand, it is judged that the sum MX(t–1) is much larger than the average value MXave(t–2) (YES in step 6), the program proceeds to the step 7.

It is judged in the step 7 whether or not the sum MX(t−1) of the values related to the motion vectors in the field which is one field preceding the current field which is stored in the save memory is much larger than the sum MX(t) of the values related to the motion vectors in the current field which is stored in the save memory (there is a difference of not less than 40 pixels, for example). When it is judged that the sum MX(t−1) is not much larger than the sum MX(t) (NO in step 7), the CPU 8 terminates an operation in the current field.

On the other hand, when it is judged that the sum MX(t−1) is much larger than the sum MX(t) (YES in step 7), the CPU 8 judges that there occurs a change point of scenes between an image constituting the field which is two fields preceding the current field and an image constituting the field which is one field preceding the current field, after which the program proceeds to the step 8.

Specifically, it is examined in the step 6 whether or not MX(t−1)>>MXave(t−2), and it is examined in the step 7 whether or not MX(t−1)>>MX(t). When the following expression (9) satisfying both the conditions holds, it is judged that the value related to the motion vector is rapidly increased, and it is judged that a scene change occurs between the (t−2)-th field and the (t−1)-th field:

$$MX(t-1)>>MXave(t-2) \cap MX(t-1)>>MX(t) \qquad (9)$$

In the step 8, data for making the delay zero is produced in the succeeding field. Consequently, in the succeeding field, the CPU 8 controls the image switching circuit 2 so that both the left eye image signal L and the right eye image signal R which are outputted from the image switching circuit 2 become 2D image signals supplied from the input terminal 1. Consequently, the left and right image signals respectively outputted from the output terminals 3 and 4 become the same image signal, and left and right images reflected on the display become the same image, whereby the same image is incident on the left eye and the right eye of the viewer, thereby to prevent the viewer from feeling uncomfortable due to the scene change. Further, hysteresis data used for calculating the delay is reset.

In the step 9, all the sums of the values related to the motion vectors in the respective fields which are stored in the save memory are cleared (erased). By the foregoing, scene change detecting processing performed this time is terminated.

The above described operation performed by the CPU 8 will be described in accordance with the scenes shown in FIG. 2. When the current field is the 14-th field, the CPU 8 judges in the step 6 whether or not the sum MX(13) of the values related to the motion vectors in the 13-th field is much larger than the average value MXave(12) of the sum of the values related to the motion vectors in the 11-th field and the sum of the values related to the motion vectors in the 12-th field. In this case, the sum MX(13) and the average value MXave(12) are approximately equal to each other, whereby the CPU 8 judges that the sum MX(13) is not much larger than the average value MXave(12), thereby to terminate the operation. That is, the CPU 8 judges that there exists no change point of scenes between the 12-th field and the 13-th field.

When the current field is the 15-th field, the CPU 8 judges in the step 6 whether or not the sum MX(14) of the values related to the motion vectors in the 14-th field is much larger than the average value MXave of the sum of the values related to the motion vectors in the 12-th field and the sum of the values related to the motion vectors in the 13-th field.

In this case, a scene change occurs in the 14-th field, whereby the values related to the motion vectors in all the areas a, b, c and d are increased. The CPU 8 judges that the sum MX(14) is much larger than the average value MXave (13), after which the program proceeds to the step 7.

The CPU 8 judges in the step 7 whether or not the sum MX(14) of the values related to the motion vectors in the 14-th field is much larger than the sum MX(15) of the values related to the motion vectors in the 15-th field. In this case, no scene change occurs in the 15-th field. Therefore, the CPU 18 judges that the value related to the motion vector is large in the area c on which a bus is reflected, while the values related to the motion vectors are small in the other areas, and the sum MX(14) is much larger than the sum MX(15), after which the program proceeds to the step 8.

Specifically, the CPU 8 judges that a change point of scenes exists between the 13-th field and the 14-th field in scene change detecting processing in the 15-th field. The image switching circuit 2 is so switched that both the left eye image signal L and the right eye image signal R become 2D image signals directly supplied from the input terminal 1 without passing through the field memory 5. That is, the delay for producing a 3D image is made zero. Consequently, the 2D image signals in the same field are respectively outputted from the output terminals 3 and 4, whereby the same image is incident on the left eye and the right eye of the viewer.

As described in the foregoing, in the 2D/3D image converter according to the present embodiment, even if a scene change occurs in the original 2D image, images representing different scenes are hardly incident on the left eye and the right eye of the viewer, thereby to make it possible to convert a 2D image in which a scene change frequently occurs into a 3D image which the viewer can view without feeling uncomfortable.

In the above described embodiment, when the CPU 8 judges that a scene change occurs, the CPU 8 so controls the image switching circuit 2 that the delay is made zero in the succeeding field. However, the CPU 8 may issue an instruction to the memory control circuit 6 so that the delay is forced to be a predetermined value other than zero. In this case, even when a scene change occurs, there is some degree of delay. When a 3D image is produced by field delay again after a scene change occurs, therefore, the viewer can view the 3D image continuously and smoothly.

Furthermore, even when there is no movement of the object, the viewer may, in some cases, recognize a 3D image by delay of several fields. Even when there is no movement of the object, therefore, the delay may, in some cases, be not zero but several fields. In this case, the above described predetermined value may be the several fields.

Furthermore, in the above described embodiment, the CPU 8 cannot judge that a scene change occurs when the current field is the 14-th field immediately after the scene change in FIG. 2, and judges that a scene change occurs when the current field is the succeeding 15-th field. Therefore, there is a problem that images respectively representing different scenes are incident on the left eye and the right eye of the viewer only during a period of two fields. Since the two fields are actually a very short period, however, the viewer hardly feels uncomfortable.

When it is desired to solve the above described problem, however, one or a plurality of field memories may be inserted into a portion between the input terminal 1 and the image switching circuit 2 and parallel with the field memory 5 (a portion indicated by A) in FIG. 1 so that the 2D image signal directly supplied from the input terminal 1 is delayed by only several fields. In this case, the image constituting the 14-th field can be outputted from the image switching circuit 2 at the same time that or after the CPU 8 judges that a scene change occurs by the values related to the motion vectors in the image constituting the 15-th field, thereby to make it possible to prevent images respectively representing different scenes from being incident on the left eye and the right eye of the viewer from the image immediately after the scene change.

In the above described first embodiment, it is judged whether or not a scene change occurs by taking the magnitude of the motion vector in the horizontal direction as the value related to the motion vector. Therefore, the motion vector is not separately detected to detect the scene change, thereby to make it possible to effectively utilize the motion vector in the horizontal direction used for determining the delay in a case where a 2D image is converted into a 3D image. In the present invention, the magnitude of the motion vector in a direction other than the horizontal direction may be used.

Although in the above described first embodiment, it is judged whether or not a scene change occurs using the average value and the sum of values related to motion vectors found by the representative point matching method, it may be judged whether or not a scene change occurs using the other values related to motion vectors as described in the following items (i), (ii) and (iii):

(i) The same processing as that in the first embodiment is performed using the minimum value of accumulated correlation values obtained at the time of detecting motion vectors by the representative point matching method.

(ii) The same processing as that in the first embodiment is performed using the difference between the minimum value of accumulated correlation values obtained at the time of detecting motion vectors by the representative point matching method and a correlation value around the minimum value, that is, a slope. The value of a parameter at this time is decreased when a scene change occurs.

(iii) The same processing as that in the first embodiment is performed using the average value of accumulated correlation values obtained at the time of detecting motion vectors by the representative point matching method.

(2) DESCRIPTION OF SECOND EMBODIMENT

Figure 4:
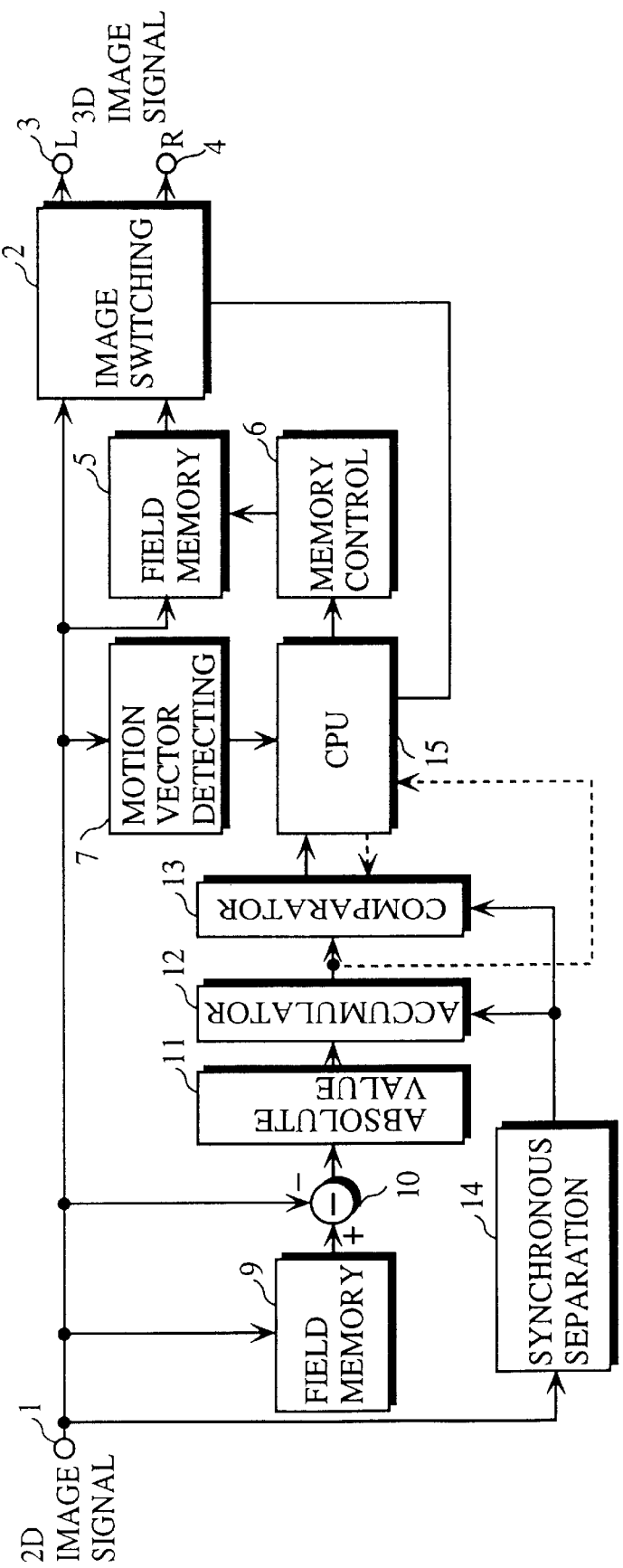
FIG. 4 is a block diagram showing the schematic construction of a 2D/3D image converter according to a second embodiment of the present invention.
Figure 5:
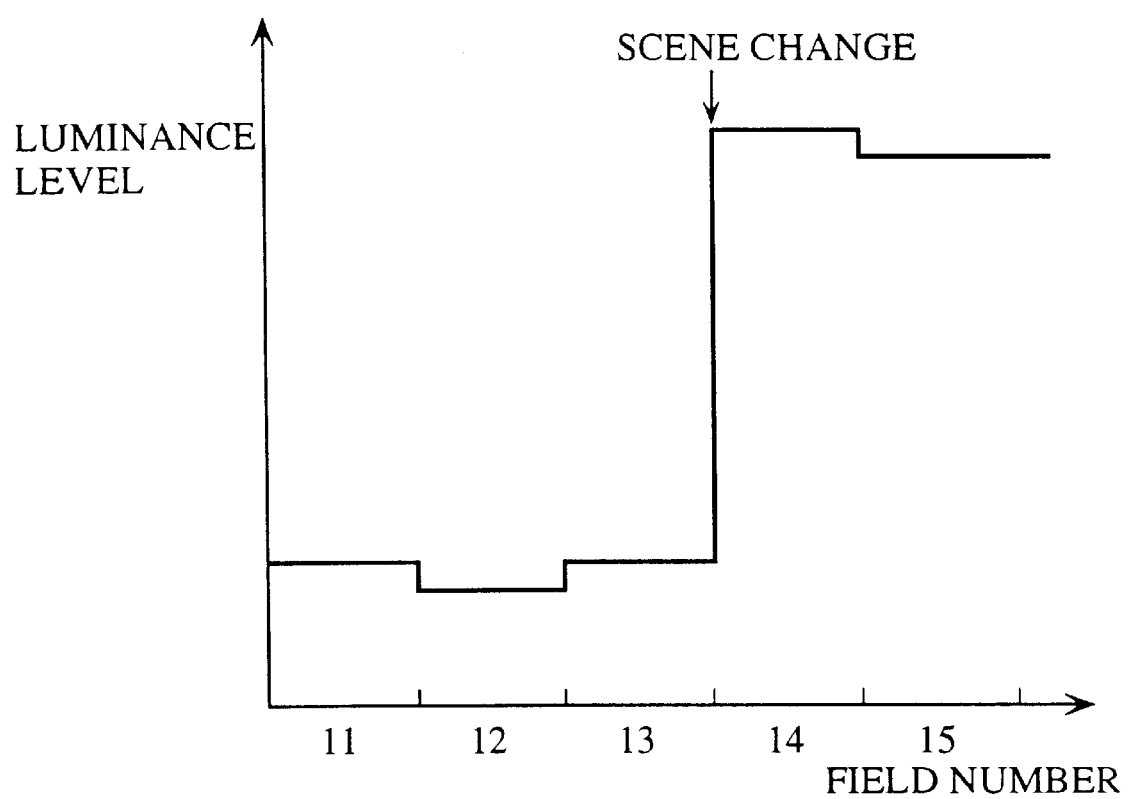
FIG. 5 is a diagram showing the change in a luminance level of the original 2D image.

Referring now to FIGS. 2, 4 and 5, a second embodiment of the present invention will be described.

FIG. 4 illustrates the schematic construction of a 2D/3D image converter. In FIG. 4, the same portions as those shown in FIG. 1 are assigned the same reference numerals and hence, the description thereof is not repeated.

In FIG. 4, reference numeral 9 denotes a field memory for delaying an inputted 2D image signal by one field and outputting the delayed 2D image signal, reference numeral 10 denotes a subtracter for subtracting an image signal directly inputted without passing through the field memory 9 from an image signal outputted from the field memory 9, reference numeral 11 denotes an absolute value circuit for outputting the absolute value of a luminance component of the image signal outputted from the subtracter 10, reference numeral 12 denotes an accumulator for adding outputs from the absolute value circuit 11, and reference numeral 13 denotes a comparator for comparing an output value from the accumulator 12 with a threshold value (for example, 32 when an inputted image is composed of 256 gray levels).

The sampling frequency of the field memory 9 is 14.32 MHz (=4 fsc), and the absolute value circuit 11 and the accumulator 12 are operated at the same frequency as the sampling frequency.

Reference numeral 14 denotes a synchronous separation circuit for extracting a vertical synchronizing signal from the inputted 2D image signal, and the vertical synchronizing signal extracted from the synchronous separation circuit 14 is inputted to the accumulator 12 and the comparator 13. The accumulator 12 adds the outputs of the absolute value circuit 11 and outputs the result of the addition until a vertical synchronizing signal is newly inputted. That is, a signal corresponding to the sum of the absolute values respectively corresponding to the differences in luminance components between image signals in the current field and image signals in a field which is one field preceding the current field is outputted for each field from the accumulator 12. The comparator 13 compares the output of the accumulator 12 with the threshold value for each field, and outputs the result of the comparison.

A CPU 15 reads the result of the comparison of the comparator 13. If the output value from the accumulator 12 is larger than the threshold value as the result of the comparison, it is judged that a scene represented by the inputted image is changed, to switch the image switching circuit 2 so that both a left eye image signal L and a right eye image signal R which are outputted from the image switching circuit 2 become 2D image signals directly supplied from the input terminal 1 without passing through a field memory 5.

A control operation of a memory control circuit 6 by the CPU 15 is the same as that by the CPU 8 shown in FIG. 1.

An operation of the 2D/3D image converter according to the second embodiment will be described on the basis of the images respectively constituting the 11-th field to the 15-th field as shown in FIG. 2.

FIG. 5 is a diagram showing a luminance level in the fields respectively constituted by the images shown in FIG. 2. The images respectively constituting the 11-th field to the 13-th field out of the fields shown in FIG. 2 are images representing the same scene, whereby the luminance level is not greatly changed. A scene change occurs between the 13-th field and the 14-th field, whereby the luminance level is rapidly increased in the 14-th field. The images respectively constituting the 14-th field to the 15-th field are images representing the same scene, whereby the luminance level is not greatly changed.

When the current field is the 11-th field to the 13-th field, the luminance level is not greatly changed because the images respectively constituting the 11-th field to the 13-th field are images representing the same scene. Therefore, the value of an output, which is the difference in the luminance level between an image constituting a field which is one field preceding the current field and an image constituting the current field, of the accumulator 12 becomes a value approximately equal to zero. As a result, the comparator 13 judges that the value of the output of the accumulator 12 is a value smaller than the threshold value. Consequently, the CPU 15 judges that there is no scene change between the 11-th field to the 13-th field, while controlling the delay as usual in the fields from the 12-th field to the 14-th field.

When the current field is the 14-th field, the luminance level is greatly changed because a scene change occurs between the 13-th field and the 14-th field as described above. Therefore, the value of an output, which is the difference in the luminance level between an image constituting the field which is one field preceding the current field and the image constituting the current field, of the accumulator 12 becomes a large value and is larger than the threshold value in the comparator 13. Consequently, the CPU 15 judges that a scene change occurs between the 13-th field and the 14-th field, to switch the image switching circuit 2 so that both the left eye image signal L and the right eye image signal R which are outputted from the image switching circuit 2 becomes 2D image signals directly supplied from the input terminal 1 without passing through the field memory 5 in the 15-th field.

When the current field is the 15-th field, the luminance level is not greatly changed because no scene change occurs in the current field, unlike that in the preceding field. The CPU 15 judges that no scene change occurs as in the 11-th field to the 13-th field, and the delay is controlled as usual in the 16-th field.

As described in the foregoing, in the 2D/3D image converter according to the second embodiment, the change of the scene represented by the original 2D image is detected by a large change in the luminance level, and the delay between the left eye image signal L and the right eye image signal R which are respectively outputted from the output terminals 3 and 4 are made zero, thereby to prevent images representing different scenes from being incident on the left and right eyes of the viewer.

The threshold value in the comparator 13 may be a fixed value, or may be a variable value controlled by the CPU 15 to which the output value from the accumulator 12 has been inputted, as indicated by a broken line shown in FIG. 4. In a case where the threshold value is a variable value, the threshold value is decreased when the output value from the accumulator 12 is smaller than the threshold value over a long time period, while being increased when the output value from the accumulator 12 is immediately made larger than the threshold value.

Although in the above described second embodiment, it is judged whether a scene change occurs by the change in the luminance level of the original 2D image, it may be judged whether or not a scene change occurs by the change in the chrominance level of the original 2D image. When a scene change occurs, the change in the chrominance level is increased.

Although in the first and second embodiments, the motion vector is detected for each field, the motion vector may be detected for each frame or for several fields. In the present invention, one frame and several fields are represented by one field in a broad sense.

(3) DESCRIPTION OF THIRD EMBODIMENT

Figure 6:
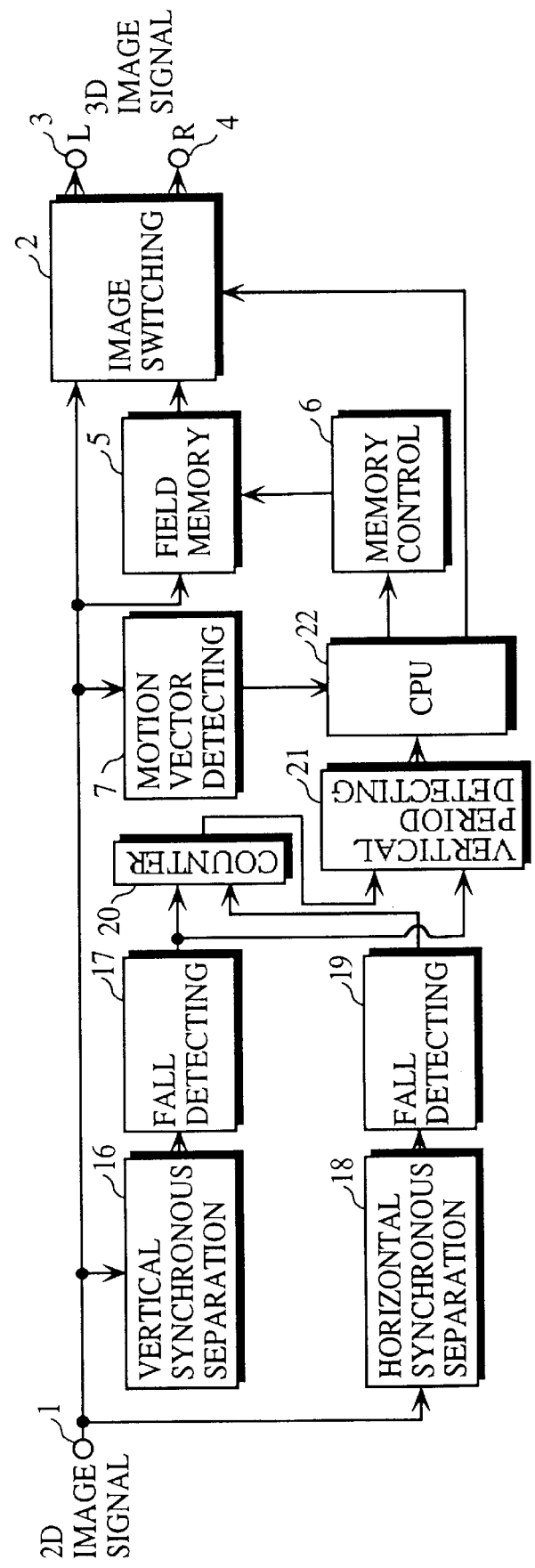
FIG. 6 is a block diagram showing the schematic construction of a 2D/3D image converter according to a third embodiment of the present invention.
Figure 7:
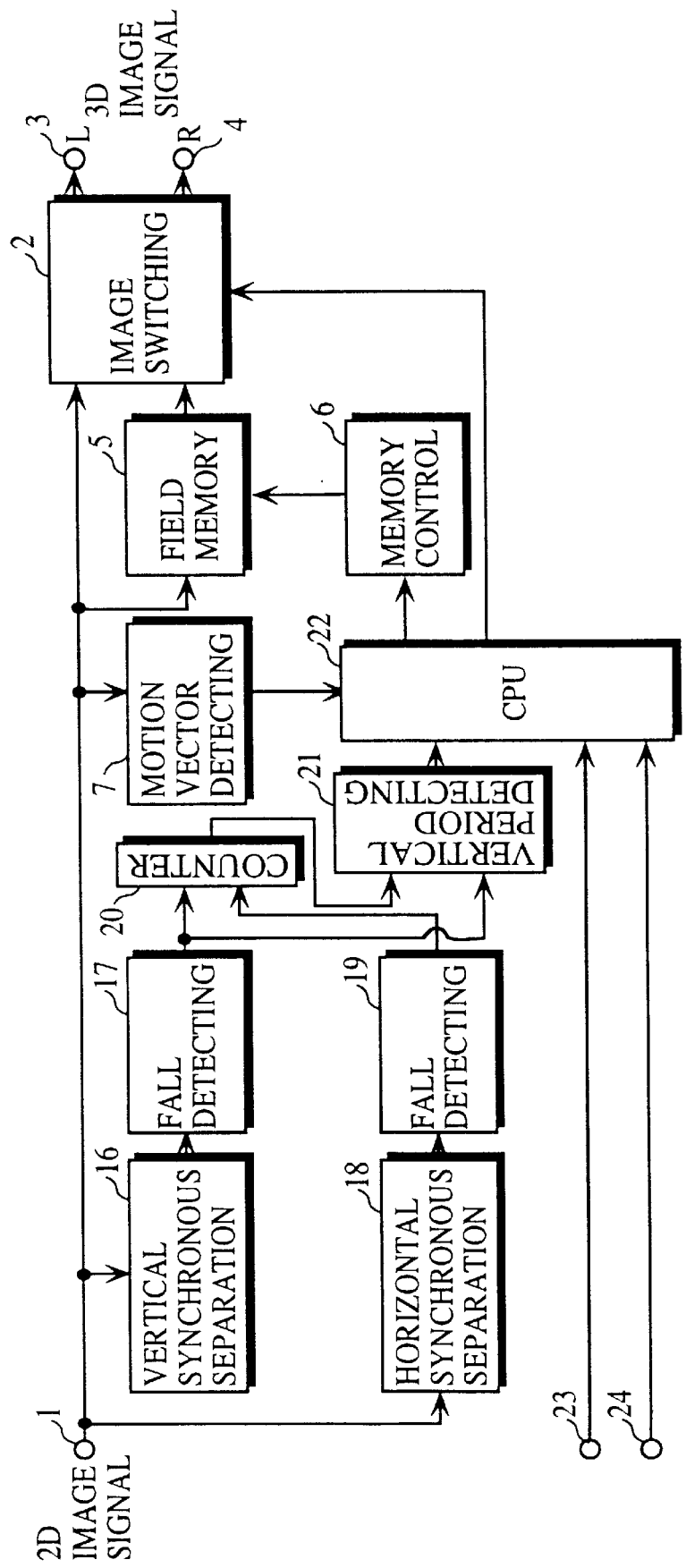
FIG. 7 is a block diagram showing the schematic construction of still another 2D/3D image converter.

Referring now to FIG. 6, a third embodiment of the present invention will be described.

FIG. 6 illustrates the schematic construction of a 2D/3D image converter. In FIG. 6, the same reference numerals as those shown in FIG. 1 are assigned the same reference numerals and hence, the description thereof is not repeated.

In FIG. 6, reference numeral 16 denotes a vertical synchronous separation circuit for extracting a vertical synchronizing signal from an inputted 2D image signal, reference numeral 17 denotes a fall detecting circuit for detecting the fall of the vertical synchronizing signal extracted by the vertical synchronous separation circuit 16, reference numeral 18 denotes a horizontal synchronous separation circuit for extracting a horizontal synchronizing signal from the inputted 2D image signal, and reference numeral 19 denotes a fall detecting circuit for detecting the fall of the horizontal synchronizing signal extracted by the horizontal synchronous separation circuit 18.

Reference numeral 20 denotes a counter for counting the number of horizontal synchronizing signals on the basis of a detection signal from the fall detecting circuit 19, which outputs the counted number as a 9-bit digital signal. In addition, the counter 20 inputs a detection signal from the fall detecting circuit 17 as a reset signal of the counter 20, and returns the counted number of horizontal synchronizing signals to zero when the detection signal from the fall detecting circuit 17 is inputted.

Reference numeral 21 denotes a vertical period detecting circuit for inputting a digital signal representing the counted number outputted from the counter 20, which detects the counted number represented by the digital signal in a case where the detection signal from the fall detecting circuit 17 is inputted.

A CPU 22 reads the counted number detected by the vertical period detecting circuit 21 for each field, judges that asynchronization occurs in the inputted image signal so that a scene is changed when the counted number is a number other than 261 or 262, and switches the image switching circuit 2 so that both a left eye image signal L and a right eye image signal R which are outputted from an image switching circuit 2 are directly supplied from the input terminal 1 without passing through a field memory 5. The timing at which the CPU 22 reads the counted number is determined by an odd field/even field judgment signal (an FLD signal) of the inputted image signal.

In the case of NTSC (National Television System Committee) television broadcasting, the number of horizontal synchronizing signals in one field period is 261 or 262 (specifically, the number in the even field is 262 if the number in the odd field is 261, while being 261 if the number in the odd field is 262). When asynchronization occurs in the inputted image signal, the number of horizontal synchronizing signals becomes a number other than 261 and 262.

A control operation of a memory control circuit 6 by the CPU 22 is the same as that by the CPU 8 shown in FIG. 1.

In the 2D/3D image converter according to the third embodiment, in a case where the original 2D image signal is an image signal of television broadcasting, when a television channel is not changed, the counted number of horizontal synchronizing signals detected by the vertical period detecting circuit 21 becomes 261 or 262 in one field period. Consequently, the CPU 22 does not judge that a scene represented by an inputted image is changed, to control the delay as usual and output left and right image signals from output terminals 3 and 4.

When the television channel is then changed, the vertical synchronization of the inputted image signal is greatly disturbed the moment the channel is changed, whereby the counted number detected by the vertical period detecting circuit 21 deviates from 261 and 262. Consequently, the CPU 22 judges that the scene represented by an inputted image is changed, to switch the image switching circuit 2 so that both the left eye image signal L and the right eye image signal R which are outputted from the image switching circuit 2 become 2D image signals directly supplied from the input terminal 1 without passing through the field memory 5. Consequently, the left and right image signals respectively outputted from the output terminals 3 and 4 become the same image signal, whereby the same image is incident on the left and right eyes of the viewer.

Furthermore, even when a source of the original 2D image signal is switched from a television signal to a reproduction signal of a VTR, the vertical synchronization of the inputted image signal is greatly disturbed in the same manner as described above, whereby the counted number detected by the vertical period detecting circuit 21 deviates from 261 and 262. Consequently, the CPU 22 judges that a scene change occurs, to switch the image switching circuit 2 so that both the left eye image signal L and the right eye image signal R which are outputted from the image switching circuit 2 become 2D image signals directly supplied from the input terminal 1 without passing through the field memory 5.

Specifically, in a case where the original 2D image signal is a television signal, when the television channel is switched or the source of the image signal is switched, a scene represented by an image displayed on a display is changed into an entirely different scene before and after the switching. In the 2D/3D image converter according to the third embodiment, such a scene change is detected by the change in the number of horizontal synchronizing signals in one field period, whereby the delay between the left eye image signal L and the right eye image signal R which are respectively outputted from the output terminals 3 and 4 are made zero. When the television channel is switched or the source of the image signal is switched as described above, therefore, the left and right images are the same, whereby the left and right eyes of the viewer are prevented from recognizing entire different images before and after the switching, thereby to prevent the viewer from feeling uncomfortable.

Furthermore, the 2D/3D image converter according to the third embodiment may be provided with a channel switching signal input terminal 23 for inputting a channel switching signal produced when the television channel is switched and a source switching signal input terminal 24 for inputting a source switching signal produced when the source of the image signal is switched, to input the switching signals inputted from the input terminals 23 and 24 to the CPU 22.

In this case, the CPU 22 inputs the channel switching signal or the source switching signal when the television channel is switched or the source is switched, whereby the CPU 22 judges that the scene represented by the inputted image is changed, to switch the image switching circuit 2 so that both the left eye image signal L and the right eye image signal R which are outputted from the image switching circuit 2 become 2D image signals directly supplied from the input terminal 1 without passing through the field memory 5. Also in this case, when the television channel is switched or the source of the image signal is switched as described above, the left and right images are the same, whereby the left and right eyes of the viewer are prevented from recognizing entire different images before and after the switching, to prevent the viewer from feeling uncomfortable.

(4) DESCRIPTION OF FOURTH EMBODIMENT

Referring now to FIGS. 8 to 19, a fourth embodiment of the present invention will be described.

The hard structure of a 2D/3D image converter is the same as that shown in FIG. 1, and the delay is set to a predetermined value, for example, zero when a scene change is detected.

In the fourth embodiment, it is judged which of a telecine converted image and a normal image other than the telecine converted image is an inputted image signal, and scene change detecting processing corresponding to the result of the judgment is performed. The telecine converted image is an image obtained by converting an image of a cinema film for television service.

Telecine conversion is made by a telecine system. An intermittent projector which is general as the telecine system intermittently sends a cinema film, irradiates light onto the cinema film in a period during which the film is stopped in an image aperture, receives the cinema film by a film camera, and converts the cinema film into an image signal for television.

Figure 8:
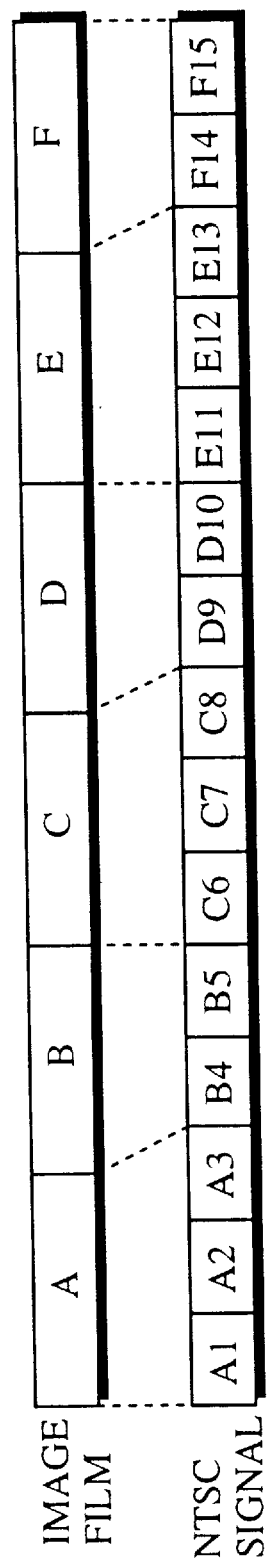
FIG. 8 is a diagram typically showing for each field an image obtained by telecine conversion using a 2–3 pull-down system.
Figure 9:
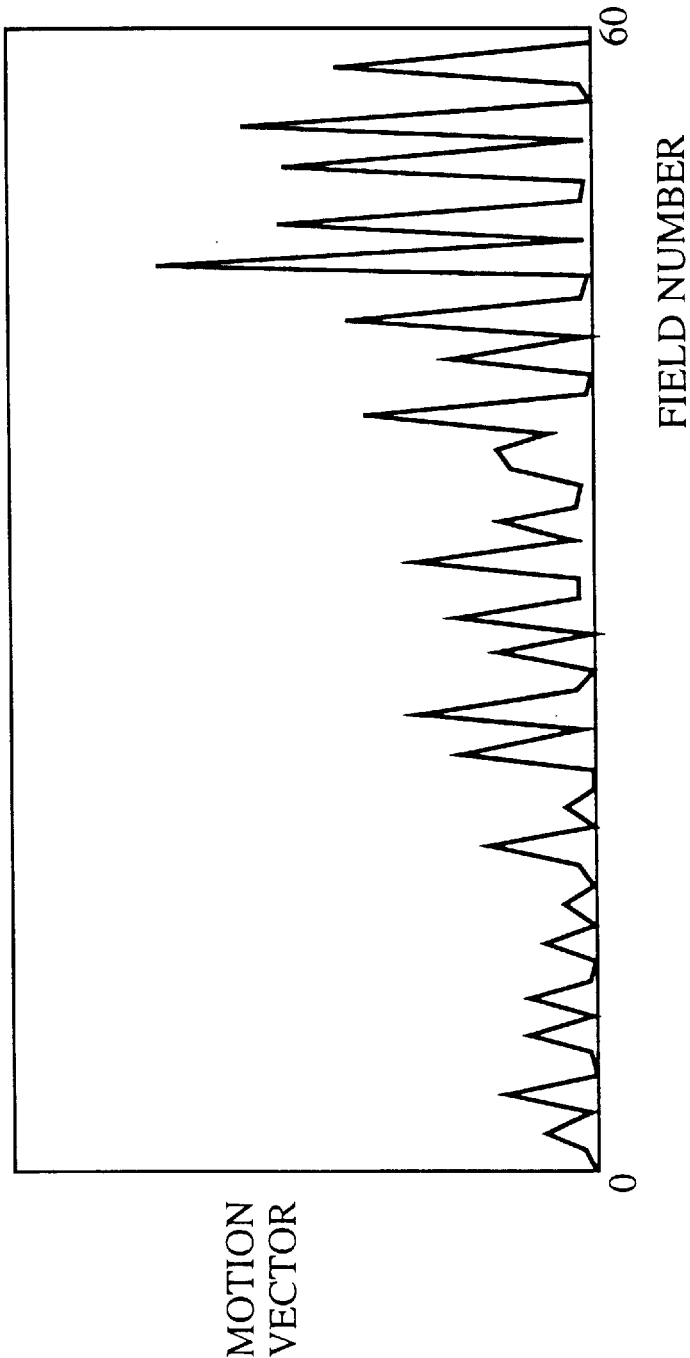
FIG. 9 is a graph showing the change in a motion vector with respect to fields in the image obtained by telecine conversion using the 2–3 pull-down system.

For example, when a cinema film composed of 24 frames per second is converted into an NTSC television signal, a frame A is continued for three fields, after which the succeeding frame B is continued for two fields, and the succeeding frame C is further continued for three fields, as shown in FIG. 8, in the obtained television signal. Such a telecine converting system is referred to as a 2–3 pull-down system.

When the telecine converted image as shown in FIG. 8 is viewed by advancing a frame for each field, a field which shows no movement appears at regular intervals. Consequently, a vector which shows no movement appears at regular intervals in a motion vector between adjacent fields if disturbance such as noise is ignored.

In the telecine converted image shown in FIG. 8, a motion vector T→B→T→B→B is detected for each change point of fields. T denotes a positive peak of the motion vector (hereinafter referred to as a top) and indicates that a frame is changed in this field, and B denotes a bottom smaller than T and indicates that the frame in the preceding field is not changed in this field.

It is judged which of a telecine converted image and a normal image other than the telecine converted image is the inputted image signal on the basis of the pattern of motion vectors corresponding to preceding several fields. Scene change detecting processing corresponding to the result of the judgment is performed.

Scene change detecting processing in a case where the inputted image signal is a normal image other than a telecine converted image and scene change detecting processing in a case where the inputted image signal is a telecine converted image will be respectively described.

(4 - 1) Description of scene change detecting processing in a case where it is judged that an inputted image signal is a normal image Description is now made of the basic idea of scene change detection in a case where it is judged that an inputted image signal is a normal image.

Figure 10:
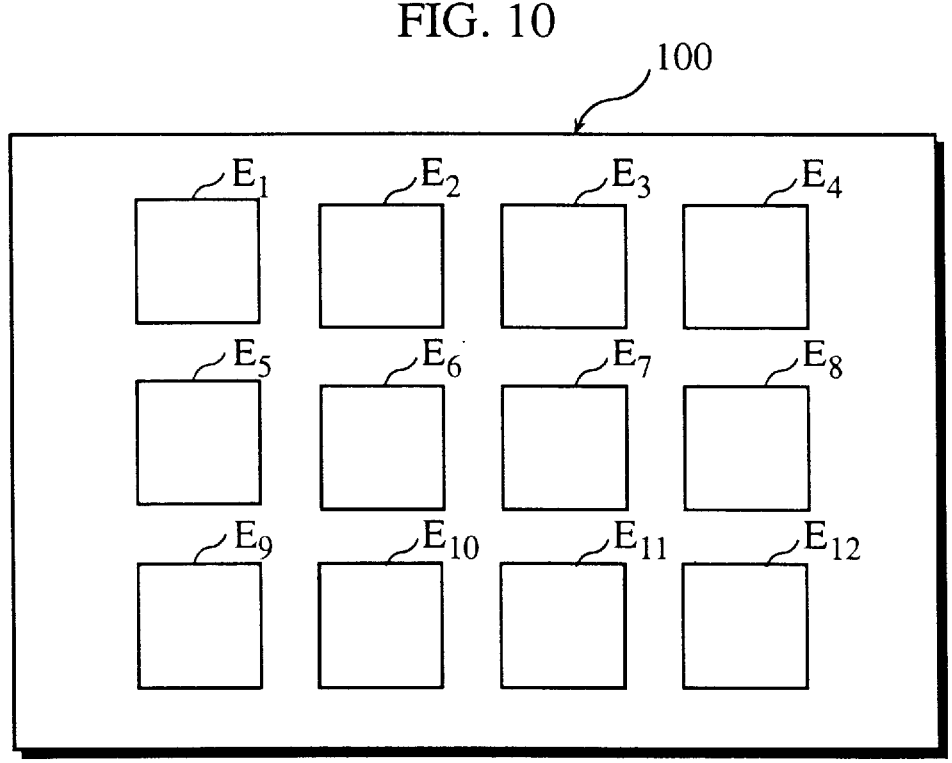
FIG. 10 is a diagram typically showing a plurality of motion vector detecting areas $E_1$ to $E_{12}$ set in an image area of each field.
Figure 11:
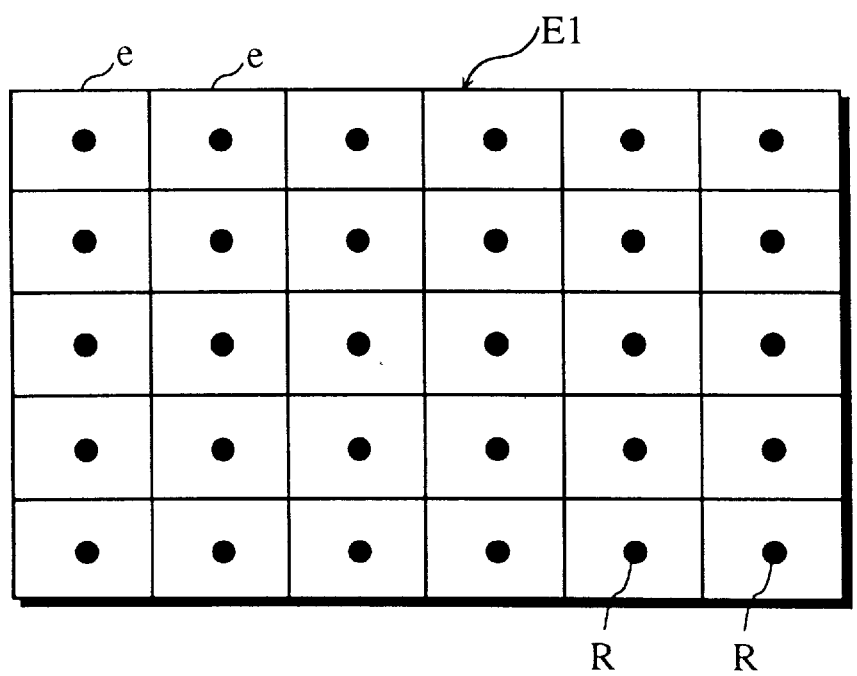
FIG. 11 is a diagram typically showing a plurality of small areas e in the motion vector detecting area shown in FIG. 10.
Figure 12:
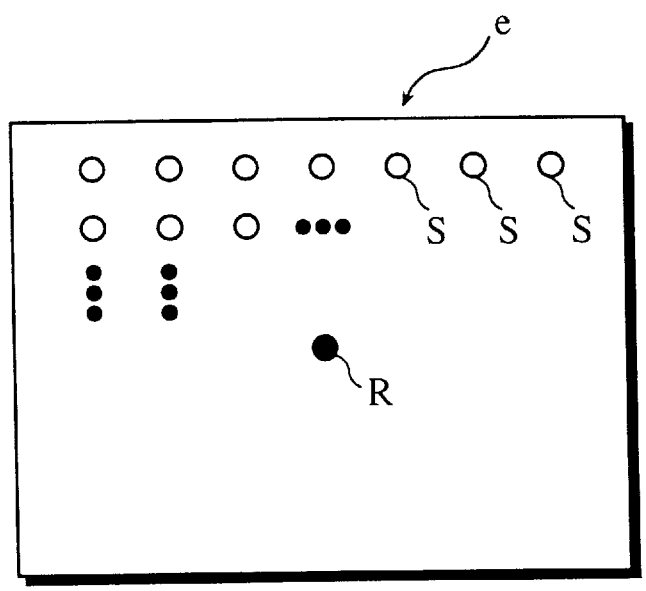
FIG. 12 is a diagram typically showing a plurality of sampling points S and one representative point R which are set in the small area e shown in FIG. 11.

First, a representative point matching method will be briefly described. As shown in FIG. 10, a plurality of motion vector detecting areas $E_1$ to $E_{12}$ are set in an image area 100 in each of fields, as shown in FIG. 10. The motion vector detecting areas $E_1$ to $E_{12}$ have the same dimensions. In addition, each of the motion vector detecting areas $E_1$ to $E_{12}$ is further divided into small areas e, as shown in FIG. 11. As shown in FIG. 12, a plurality of sampling points S and one representative point R are set in each of the small areas e.

The difference between an image signal level (a luminance level) at each of sampling points S in a small area p in the current field and an image signal level (a luminance level) at a representative point R in a corresponding small area e in the preceding field (a correlation value at each of the sampling points) is found for each of the motion vector detecting areas $E_1$ to $E_{12}$. Correlation values at sampling points which are the same in displacement from the representative point R are accumulated between all small areas in each of the motion vector detecting areas $E_1$ to $E_{12}$. Consequently, accumulated correlation values the number of which corresponds to the number of sampling points in one small area p are found for each of the motion vector detecting areas $E_1$ to $E_{12}$.

The displacement of a point at which the minimum accumulated correlation value is obtained, that is, the displacement of a point at which correlation is the highest in each of the motion vector detecting areas $E_1$ to $E_{12}$ is extracted as a motion vector (the movement of an object) in the motion vector detecting area.

The minimum value of the accumulated correlation values obtained at the time of detecting the motion vectors by the representative point matching method which is a parameter sensibly reacting to the change in the luminance level of the representative point is used for scene change detection. The minimum values of the accumulated correlation values obtained in the respective motion vector detecting areas in one field are added, and a value obtained by dividing the result of the addition by the total number of motion vector detecting areas (the average value of the minimum values of the accumulated correlation values) is defined as MIN.

Figure 13:
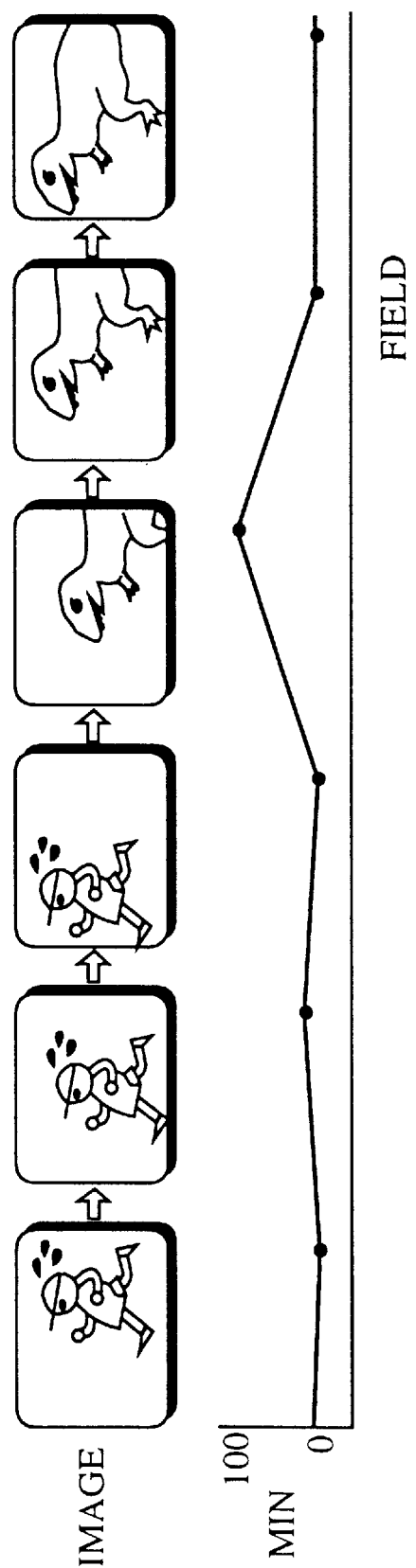
FIG. 13 is a graph showing the change in MIN in a case where a scene change occurs in a normal image other than a telecine converted image.

FIG. 13 illustrates the change in MIN in a case where a scene change occurs in a normal image. As shown in FIG. 13, MIN varies relatively slowly unless a scene change occurs in the normal image. In addition, MIN is increased and MIN greatly varies when a scene change occurs.

In the normal image, therefore, it is possible to detect the occurrence of a scene change depending on whether or not the difference between MIN in the current field and MIN in the preceding field is larger than a predetermined value $\alpha$, as indicated by the following expression (10):

$$MIN_j - MIN_{j-1} > \alpha \qquad (10)$$

In the foregoing expression (10), $MIN_j$ represents the average value of the minimum values of accumulated correlation values in the current field (the j-th field), and $MIN_{j-1}$ represents the average value of the minimum values of accumulated correlation values in the preceding field (the (j−1)-th field). $\alpha$ represents a threshold value which is relatively large. A scene change detecting method based on the foregoing expression (10) shall be referred to as a scene change detecting method based on peak detection.

Figure 14:
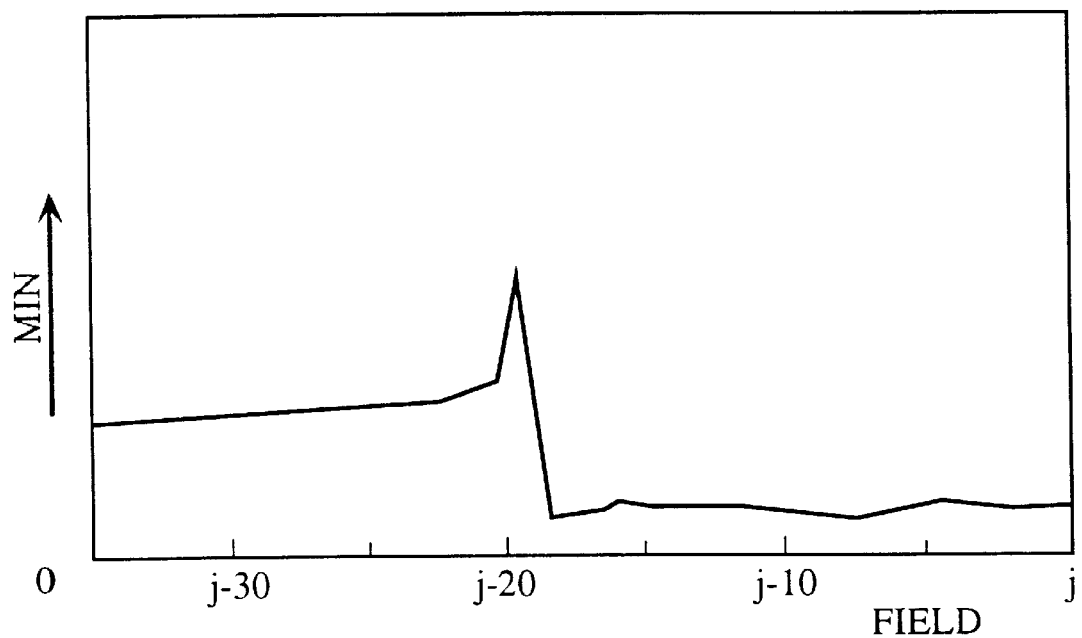
FIG. 14 is a graph showing the change in MIN in a case where a scene change occurs in a normal image other than a telecine converted image.

In the scene change detecting method based on peak detection, the current field cannot, in some cases, be detected as a field where a scene change occurs because the difference between $MIN_{j-19}$ in the current field and $MIN_{j-20}$ in the preceding field is not more than the threshold value $\alpha$ as at a peak in the (j−19)-th field shown in FIG. 14. The reason for this is that the threshold value $\alpha$ in the foregoing expression (10) is set to a value higher to some extent in order not to erroneously detect a scene change.

In order to detect a scene change as shown in FIG. 14, it must be verified that the scene change occurs after the scene change. A method of detecting a scene change by verifying that the scene change occurs after the scene change is referred to as a scene change detecting method based on subsequent peak detection.

In the scene change detecting method based on subsequent peak detection with respect to a normal image, it is judged whether or not both the conditions indicated by the following expressions (11) and (12) are satisfied. If both the conditions are satisfied, it is considered that a scene change occurs in the preceding field:

$$MIN_{j-1} - MIN_j > \beta_1 \qquad (11)$$

$$MIN_{j-1} - MIN_{j-2} \beta_2 \qquad (12)$$

In the foregoing expressions (11) and (12), $\beta_1$ and $\beta_2$ represents threshold values, and the relationship between the threshold values $\beta_1$ and $\beta_2$ and 1 the relationship between the threshold value $\beta_2$ and $\alpha$ are a relationship as indicated by the following expressions (13):

$$\beta_1 \geq \beta_2$$

$$\alpha > \beta_2 \qquad (13)$$

Specifically, in the scene change detecting method based on subsequent peak detection with respect to a normal image, when MIN in the preceding field is larger by more than a predetermined value $\beta_1$ than MIN in the current field, and MIN in the preceding field is larger by more than a predetermined value $\beta_2$ than MIN in the preceding field, it is judged that a scene change occurs in the preceding field.

Figure 15:
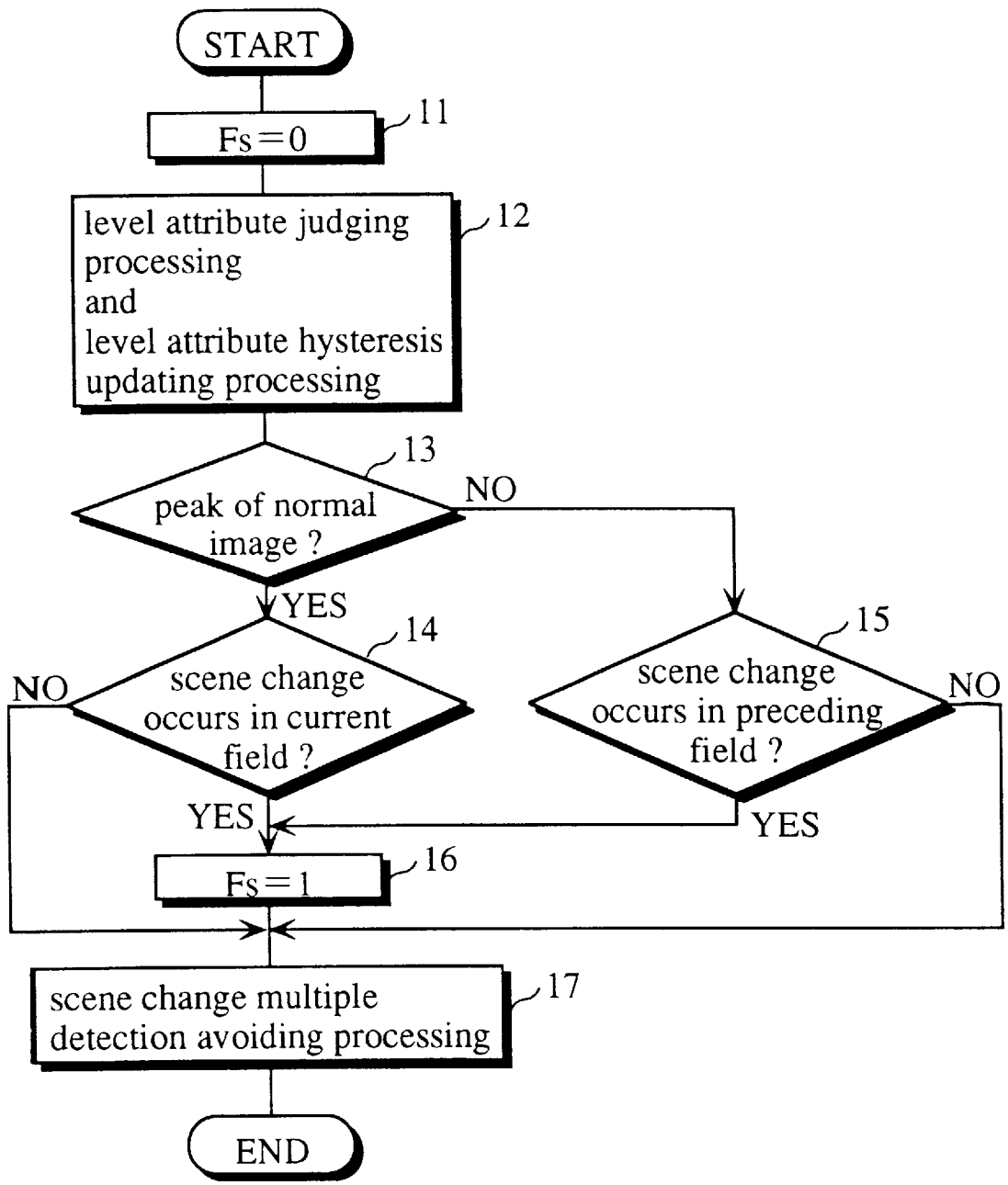
FIG. 15 is a flow chart showing the procedure for scene change detecting processing in a case where an inputted image signal is a normal image other than a telecine converted image.

FIG. 15 illustrates the procedure for scene change detecting processing performed for each field in an inputted image signal when it is judged that the inputted image signal is a normal image other than a telecine converted image.

A scene change detecting flag Fs is first reset (Fs=0) (step 11).

Level attribute judging processing and level attribute hysteresis updating processing are then performed (step 12). In the level attribute judging processing, it is judged whether or not a value obtained by subtracting $MIN_{j-1}$ in the preceding field from $MIN_j$ in the current field is not less than a relatively small threshold value $\nu$ ($\nu \leq \beta_2$), as indicated by the following expressions (14). A level attribute $1r_j$ corresponding to the current field is made "1" if $MIN_j - MIN_{j-1}$ is not less than $\nu$, while being made "0" if $MIN_j - MIN_{j-1}$ is less than $\nu$.

$$MIN_j - MIN_{j-1} \geq \nu \text{ then } 1_{r_j} = 1$$

$$MIN_j - MIN_{j-1} < \nu \text{ then } 1_{r_j} = 0 \qquad (14)$$

The level attribute $1r_j$ thus determined is stored as level attribute hystereses $1r_{j-15}$ to $1r_j$ in 15 fields succeeding the current field. In the level attribute hysteresis updating processing, the level attribute hystereses which have been stored are updated by the level attribute $1r_j$ corresponding to the current field newly obtained.

It is then judged whether or not $MIN_j$ in the current field is a peak of the normal image on the basis of the level attribute hystereses $1r_{j-15}$ to $1r_j$ updated in the step 12 (step 13). Specifically, it is judged that $MIN_j$ in the current field is the peak of the normal image when the level attribute $1r_j$ corresponding to the current field which is judged in the step 12 is 1 and all the level attributes $1r_j$ corresponding to 15 fields preceding the current field are zero, while it is judged that $MIN_j$ in the current field is not the peak of the normal image in the other cases.

When it is judged in the step 13 that $MIN_j$ in the current field is the peak of the normal image, it is judged whether or not a scene change occurs in the current field by the scene change detecting method based on peak detection indicated by the foregoing expression (10) (step 14). When it is judged that a scene change occurs in the current field, the scene change detecting flag Fs is set (Fs=1) (step 16).

After scene change multiple detection avoiding processing is then performed (step 17), the current scene change detecting processing is terminated. The scene change multiple detection avoiding processing will be described later.

When it is judged in the foregoing step 13 that $MIN_{j1}$ in the current field is not the peak of the normal image, it is judged whether or not a scene change occurs in the preceding field by the scene change detecting method based on subsequent peak detection indicated by the foregoing expressions (11) and (12) (step 15). When it is judged that a scene change occurs in the preceding field, the scene change detecting flag Fs is set (Fs=1) (step 16).

After the scene change multiple detection avoiding processing is then performed (step 17), the current scene change detecting processing is terminated.

In the scene change multiple detection avoiding processing, processing for preventing a scene change from being frequently detected is performed. After a scene change occurs, another scene change rarely occurs within several 10 fields. In the scene change multiple detection avoiding processing, therefore, in a case where a scene change is detected in a certain field, even if another scene change is detected within several 10 fields after the detection, the detection is rendered void.

Specifically, in a case where a scene change is detected in a certain field, even if the scene change detecting flag Fs is set in the step 16 within several 10 fields after the detection, the scene change detecting flag Fs is reset in the scene change multiple detection avoiding processing.

When the scene change detecting flag Fs is set in the current scene change detecting processing, the delay is made zero in the succeeding field.

(4 - 2) Description of scene change detecting processing in a case where it is judged that an inputted image signal is a telecine converted image Description is made of the basic idea of scene change detection in a case where an inputted image signal is a telecine converted image.

Figure 16:
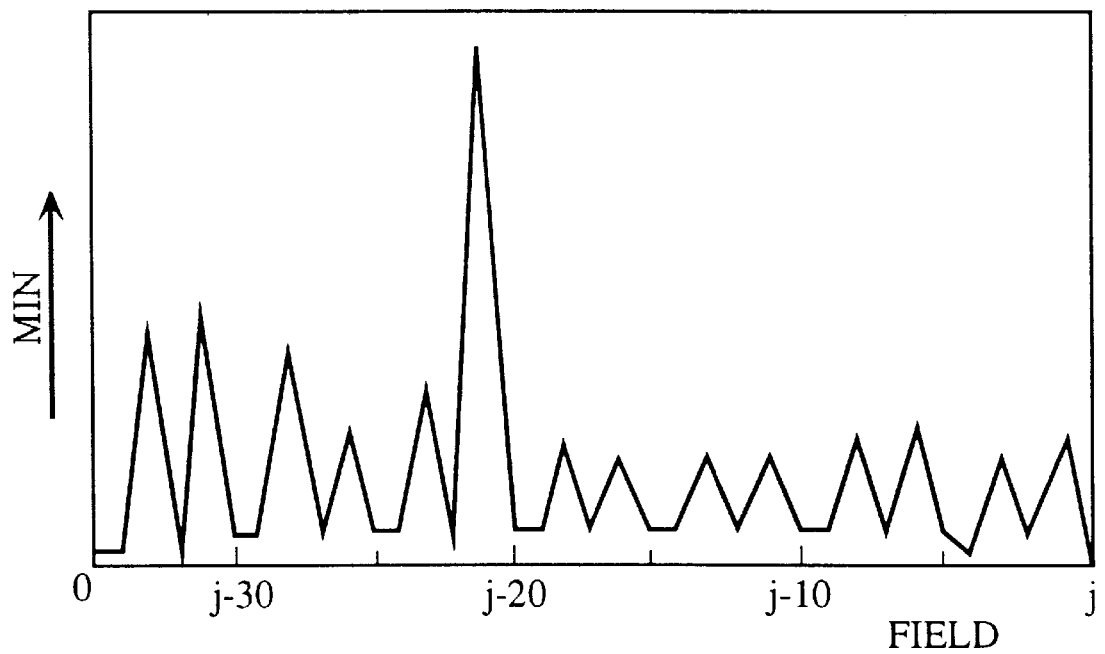
FIG. 16 is a graph showing the change in MIN in a case where a scene change occurs in a telecine converted image.

FIG. 16 shows the change in MIN with respect to each of fields in a telecine converted image obtained by telecine conversion using a 2–3 pull-down system. In the telecine converted image, MIN is decreased (corresponds to a bottom) when the same frame is continued, MIN is increased (corresponds to a top) when the frame is changed, as shown in FIG. 16. If the frame is changed, therefore, it seems as if a scene change occurs. When the scene change is detected on the basis of the foregoing expression (10) with respect to the telecine converted image, therefore, a change point of frames may be erroneously detected as a scene change.

In order to avoid such erroneous detection, the scene change is detected by comparing values of MIN between tops with respect to the telecine converted image. A method of detecting a scene change by comparing the values of MIN between tops shall be referred to as a scene change detecting method based on envelope detection.

In the scene change detecting method based on envelope detection, when all the conditions as indicated by the following expressions (15), (16) and (17) are satisfied, it is considered that a scene change occurs:

$$TOP_0 - TOP_1 > \delta \qquad (15)$$

$$TOP_0 - TOP_2 > \delta \qquad (16)$$

$$TOP_0 - TOP_1 > |TOP_1 - TOP_2| + \theta \qquad (17)$$

In the foregoing expressions (15), (16) and (17), $TOP_0$ indicates a value of MIN corresponding to a top in the current field, $TPO_1$ indicates a value of MIN corresponding to a top which is one top preceding the top in the current field, and $TOP_2$ indicates a value of MIN corresponding to a top which is two tops preceding the top in the current field. In addition, $\delta$ is a threshold value which is relatively large. Further, $\theta$ in the foregoing expression (17) is a relatively small value satisfying $\theta < \delta$.

Specifically, when all the following three conditions are satisfied, it is considered that a scene change occurs.

(i) A top in the current field is sufficiently larger than a top which is one top preceding the top in the current field.

(ii) A top in the current field is sufficiently larger than a top which is two tops preceding the top in the current field.

(iii) The difference between the top in the current field and the top which is one top preceding the top in the current field is larger than a value obtained by adding $\theta$ to the absolute value of the difference between the top which is one top preceding the top in the current field and the top which is two tops preceding the top in the current field.

In the scene change detecting method based on envelope detection, it is possible to detect a scene change only by the conditions indicated by the foregoing expression (15) in principle. In this example, however, the conditions indicated by the foregoing expression (16) are added so as to prevent erroneous detection caused by the decrease in the top which is one top preceding the top in the current field due to disturbance or the like. Further, in this example, the conditions indicated by the foregoing expression (17) are added in order to prevent the scene change from being erroneously detected when the top has a tendency to abruptly increase over several fields.

Figure 17:
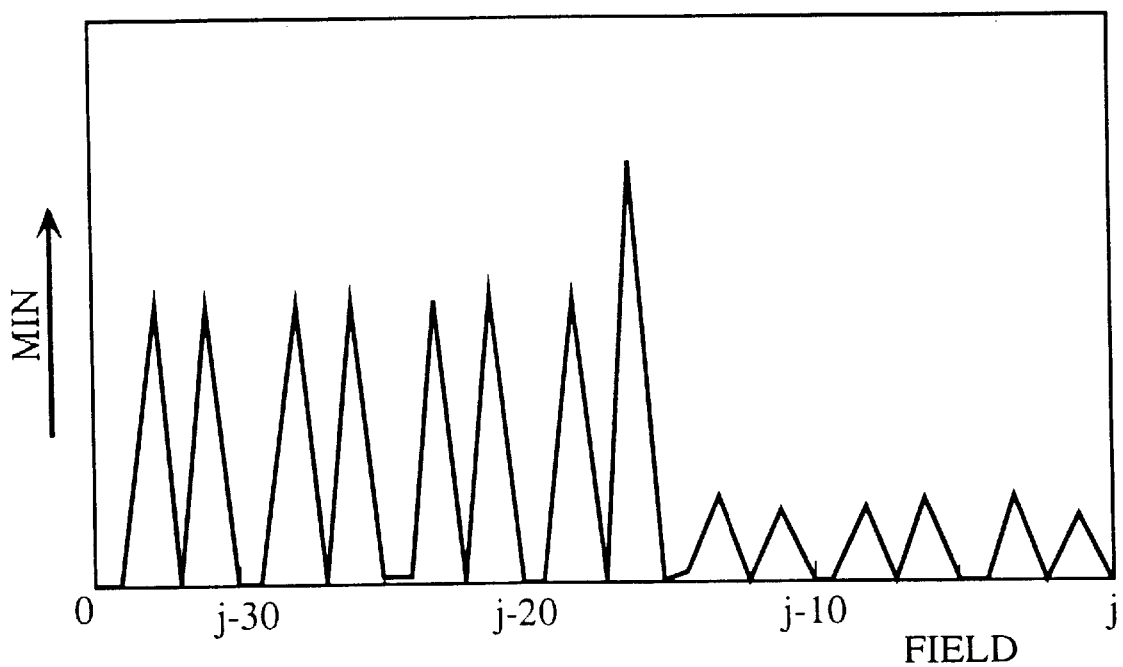
FIG. 17 is a graph showing the change in MIN in a case where a scene change occurs in a telecine converted image.

In the scene change detecting method based on envelope detection, even when it is verified from the difference between the top in the current field and the top which is one top succeeding the top in the current field that the current field is a field where a scene change occurs as in the (j–16)-th field shown in FIG. 17, the current field cannot, in some cases, be detected as a field where a scene change occurs. The reason for this is that the threshold value $\delta$ in the foregoing expressions (15) and (16) is set to a value higher to some extent in order not to erroneously detect the scene change.

In order to detect a scene change as shown in FIG. 17, it is necessary to verify that the scene change occurs after the scene change. A method of detecting a scene change by verifying that the scene change occurs after the scene change is referred to as a scene change detecting method based on subsequent envelope detection.

In the scene change detecting method based on subsequent envelope detection, only when a top peculiar to the telecine converted image is detected after detecting a field where a scene change seems to occur (hereinafter referred to as a field where there is a temporary scene change), it can be judged whether or not the temporary scene change is a true scene change.

When a top in a field where there is a temporary scene change is detected on the basis of the foregoing expressions (11) and (12) used for subsequent peak detection with respect to the normal image, after which a telecine period is not disturbed so that the following expression (18) is satisfied up to the succeeding top, therefore, it is judged that the temporary scene change is a true scene change.

Specifically, when MIN in the preceding field is larger by more than a predetermined value $\beta_1$ than MIN in the current field, and MIN in the preceding field is further larger by more than a predetermined value $\beta_2$ than MIN in a field preceding the preceding field, it is judged that the preceding field is a field where there is a temporary scene change. Thereafter, when the following expression (18) is satisfied in each of the fields up to the succeeding top, it is judged that a true scene change occurs in the field where there is a temporary scene change:

$$TOPseen - MIN_j > \beta_1 \qquad (18)$$

TOPseen indicates MIN in a field where there is a temporary scene change. In each of the fields from a field where a temporary scene change is detected to a field where the succeeding top is detected, therefore, if MIN in the field where there is a temporary scene change (TOPseen) is larger by more than a threshold value $\beta_1$ than MIN in the field, it is judged that the temporary scene change is a true scene change.

In a case where even if a top in a field where a scene change may occur is detected, the subsequent telecine period is distorted, however, the scene change cannot be judged unless the maximum number of continuations of a bottom of a telecine converted image plus one field has elapsed, whereby the detection of the scene change may be delayed. In the scene change detecting method based on subsequent envelope detection with respect to a telecine converted image obtained by telecine conversion using a 2–3 pull-down system, therefore, when the succeeding top is not detected within three fields after detecting the temporary scene change, it is judged that the temporary scene change is a true scene change if the foregoing expression (18) holds over three fields after detecting the temporary scene change.

When MIN which does not satisfy the foregoing expression (18) appears before the succeeding top is detected after detecting the temporary scene change, or when MIN which does not satisfy the foregoing expression (18) appears within three fields after detecting the temporary scene change, it is judged that the temporary scene change is not a true scene change. Thereafter, the scene change detecting processing based on subsequent envelope detection is terminated.

Figure 18A:
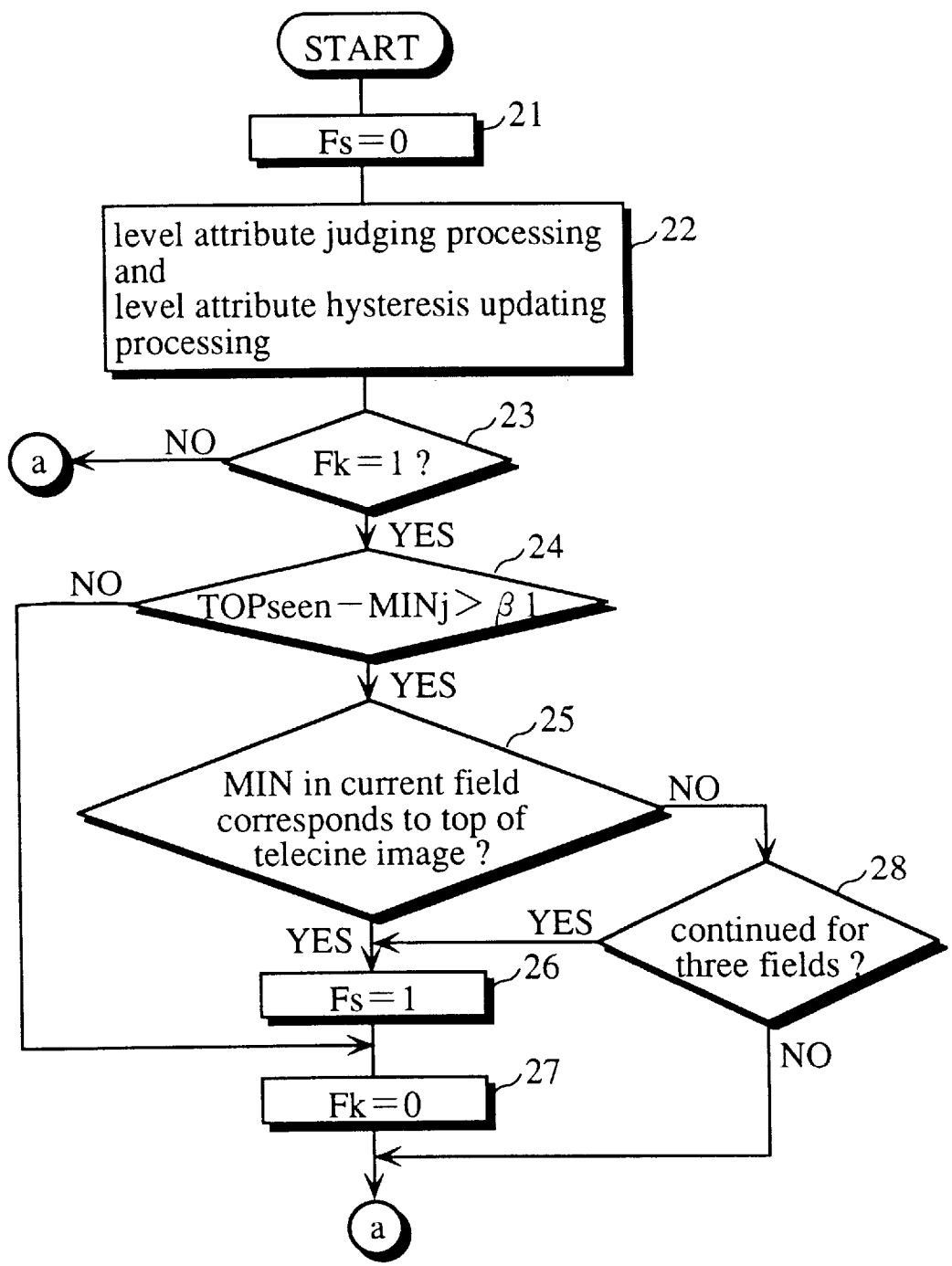
FIGS. 18a and 18b are flow charts showing the procedure for scene change detecting processing in a case where an inputted image signal is a telecine converted image.
Figure 18B:
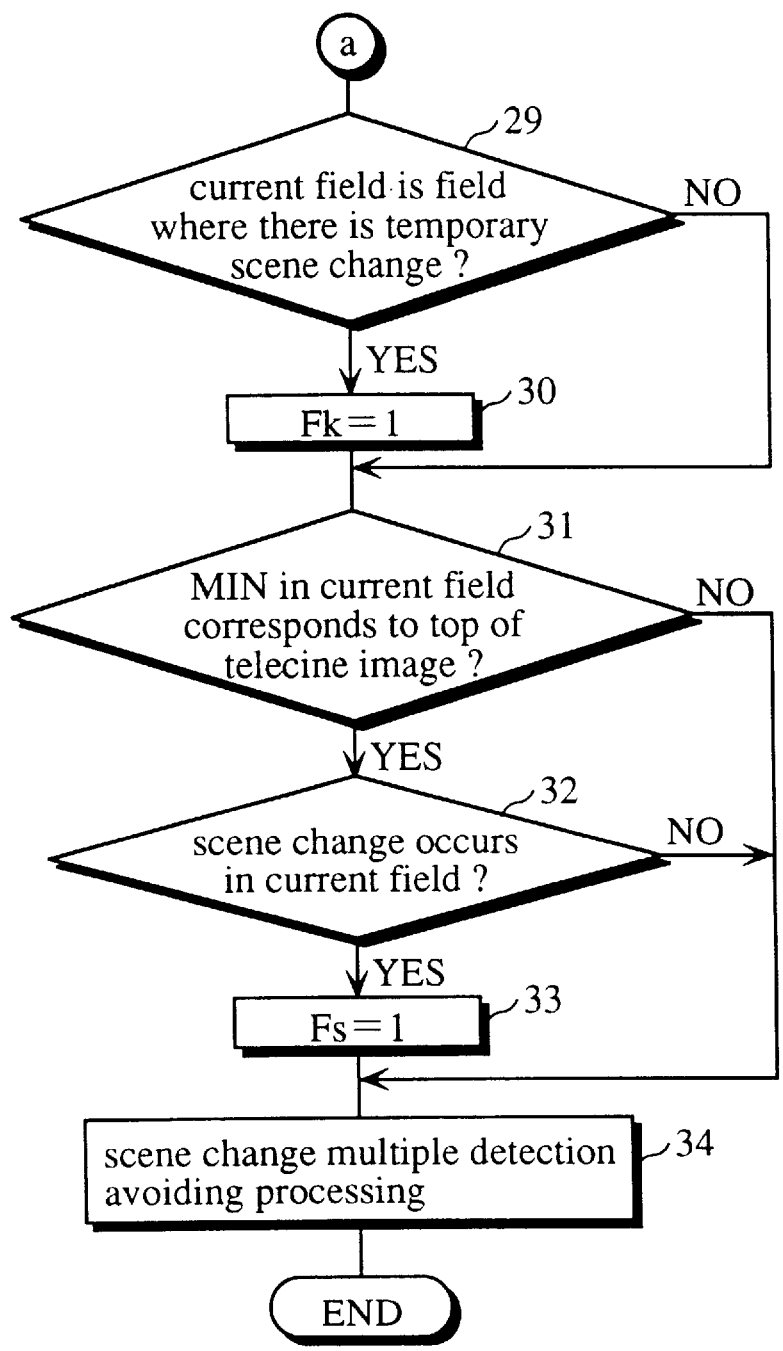

FIGS. 18a and 18b show the procedure for scene change detecting processing performed for each field of an inputted image signal when it is judged that the inputted image signal is a telecine converted image.

A scene change detecting flag Fs is first reset (Fs=0) (step 21).

Level attribute judging processing and level attribute hysteresis updating processing are performed as in the step 12 shown in FIG. 15 (step 22).

It is then judged whether or not scene change detecting processing based on subsequent envelope detection is continued on the basis of a flag Fk indicating whether or not scene change detecting processing based on subsequent envelope detection is continued (step 23). Specifically, it is judged that the scene change detecting processing based on subsequent envelope detection is continued if the flag Fk is set (Fk=1), while it is judged that the scene change detecting processing based on subsequent envelope detection is not continued if the flag Fk is reset (Fk=0).

When the scene change detecting processing based on subsequent envelope detection is continued, it is judged whether or not the foregoing expression (18) holds on the basis of MIN in the current field and MIN in a field where there is a temporary scene change (TOPseen) (step 24).

When the foregoing expression (18) holds, it is judged whether or not MIN in the current field corresponds to a top of a telecine converted image (step 25). This judgment is made in the following manner, for example.

Specifically, if MIN in the current field is larger than one-half the sum of MIN corresponding to the latest top and MIN corresponding to the latest bottom, it is judged that MIN in the current field corresponds to a top of the telecine converted image. On the contrary, if MIN in the current field is not more than one-half the sum of MIN corresponding to the latest top and MIN corresponding to the latest bottom, it is judged that MIN in the current field does not correspond to a top of the telecine converted image, that is, corresponds to a bottom thereof. However, it is judged that MIN in the current field corresponds to a top when it is judged that all values of MIN in a predetermined number of fields preceding the current field are all bottoms, while it is judged that MIN in the current field corresponds to a bottom when it is judged that all values of MIN in a predetermined number of fields preceding the current field are all tops.

When MIN in the current field corresponds to a top of the telecine converted image, it is judged that a temporary scene change which has been already detected is a true scene change, whereby the scene change detecting flag Fs is set (Fs=1) (step 26). On the other hand, the scene change detecting processing based on subsequent envelope detection is terminated, whereby the flag Fk is reset (Fk=0) (step 27), after which the program proceeds to the step 29.

When MIN in the current field does not correspond to a top (step 28), it is judged whether or not the foregoing expression (18) holds continuously for three fields (step 28). When the foregoing expression (18) holds continuously for three fields, it is judged that the temporary scene change is a true scene change, whereby the scene change detecting flag Fs is set (Fs=1) (step 26). On the other hand, the scene change detecting processing based on subsequent envelope detection is terminated, whereby the flag Fk is reset (Fk=0) (step 27), after which the program proceeds to the step 29.

When it is not judged in the foregoing step 28 that the foregoing expression (18) holds continuously for three fields, the program proceeds to the step 29 without setting the flag Fs and resetting the flag Fk.

Furthermore, when the foregoing expression (18) does not hold in the foregoing step 24, the flag Fk is reset (Fk=0) (step 27), after which the program proceeds to the step 29.

Additionally, when it is judged in the foregoing step 23 that the scene change detecting processing based on subsequent envelope detection is not continued (Fk=0), the program proceeds to the step 29 without setting the flag Fs and resetting the flag Fk.

It is judged in the step 29 whether or not the current field is a field where there is a temporary scene change on the basis of the foregoing expressions (11) and (12). When the current field is a field where there is a temporary scene change, the flag Fk is set in order to start the scene change detecting processing based on subsequent envelope detection in the succeeding field with respect to the temporary scene change detected (step 30).

When the program proceeds to the step 29 from the step 28, the scene change detecting processing based on subsequent envelope detection is continued with respect to the temporary scene change already detected. In this case, therefore, a problem arises if a temporary scene change is newly detected in the step 29. However, it is when MIN in the current field corresponds to a top of the telecine converted image that it is judged in the step 29 that the current field is a field where there is a temporary scene change.

When MIN in the current field corresponds to a top of the telecine converted image, the answer is in the affirmative in the step 25 previous to the step 28, whereby the program does not proceed to the step 28. When the program proceeds to the step 29 from the step 28, therefore, it is not judged in the step 29 that the current field is a field where there is a temporary scene change.

When the temporary scene change is not detected in the foregoing step 29, or when the flag Fk is set in the foregoing step 30, the program proceeds to the step 31.

It is judged in the step 31 whether or not MIN in the current field corresponds to a top of the telecine converted image. When it is judged that MIN in the current field corresponds to a top of the telecine converted image, it is judged whether or not a scene change occurs in the current field by the scene change detecting processing based on envelope detection as indicated by the foregoing expressions (15), (16) and (17) (step 32). When it is judged that a scene change occurs in the current field, the scene change detecting flag Fs is set (Fs=1) (step 33), after which the program proceeds to the step 34.

When it is judged in the step 31 that MIN in the current field does not correspond to a top of the telecine converted image, the program proceeds to the step 34.

In the step 34, scene change multiple detection avoiding processing is performed, as in the step 17 shown in FIG. 15. The scene change detecting processing performed this time is terminated.

When the scene change detecting flag Fs is set in the scene change detecting processing performed this time, the delay is made zero in the succeeding field.

Although in the foregoing example, description was made of the scene change detecting processing with respect to a telecine converted image obtained by telecine conversion using the 2–3 pull-down system, the above described scene change detecting method is applied to an intermittent image such as a telecine converted image obtained by telecine conversion using a 2—2 pull-down system or the like, thereby to make it possible to accurately detect a scene change.

Meanwhile, a scene on which a flashbulb of a camera is lighted rarely exists in an actual image. If the scene change detecting processing shown in FIG. 15 and FIGS. 18a and 18b is applied to such an image, the luminance level of an image in a portion where the flashbulb is lighted is rapidly increased, whereby MIN is also rapidly increased. Therefore, there may occur such erroneous detection that it is considered that a scene change occurs, although a scene is not changed.

Description is now made of a method of decreasing an erroneous detection rate of a scene change with respect to an image having a part affected by flashing.

When the effect of flashing is limited only to a part of the image, there is continuation in the movement of an object and a background in the other part. In order to decrease erroneous detection of a scene change by flashing, therefore, the conditions that no scene change occurs if there is continuation in the movement of the object and the background may be incorporated into a scene change detection algorithm.

In order to realize the incorporation in the scene change detection algorithm, it is important to monitor the continuation of the movement of the object and the background with high precision to detect the presence or absence of the continuation. Examples of a feasible method in the current 2D/3D image converter include a method of monitoring the degree to which a motion vector in the current field and a motion vector in the preceding field are changed. The foregoing will be described.

A motion vector in the horizontal direction and a motion vector in the vertical direction in the i-th vector detecting area in the current field (the j-th field) are respectively taken as $x_{ij}$ and $y_{ij}$. In this case, the differences $diffx_{ij}$ and $diffy_{ij}$ in the horizontal direction and the vertical direction between the motion vector in the current field and the motion vector in the preceding field (the (j−1)-th field) in the i-th detecting area are respectively indicated by the following equations (19):

$$diffx_{ij} = x_{ij} - x_{i(j-1)}$$

$$diffy_{ij} = y_{ij} - y_{i(j-1)} \qquad (19)$$

In $diffs_{ij}$ and $diffy_{ij}$, however, it is difficult to treat a movement having an acceleration component. Therefore, the movement is verified using $ddx_{ij}$ and $ddy_{ij}$ as indicated by the following equations (20):

$$ddx_{ij} = |diffx_{ij} - diffx_{i(j-1)}|$$

$$ddy_{ij} = |diffy_{ij} - diffy_{i(j-1)}| \qquad (20)$$

Specifically, unless $ddx_{ij}$ and $ddy_{ij}$ exceed a certain range, it can be considered that the continuation of the movement in the i-th vector detecting area is held. This judgment is made for each field with respect to all the areas used for detecting the scene change, and the judgment is stored as a hysteresis.

For example, a numeral "1" indicating that continuation is held is recorded on a hysteresis $pd_{ij}$ if both $ddx_{ij}$ and $ddy_{ij}$ in the i-th detecting area in the j-th field are not more than two pixels, while a numeral "0" indicating that continuation is not held is recorded on the hysteresis $pd_{ij}$ if at least one of $ddx_{ij}$ and $ddy_{ij}$ is more than two pixels, as indicated by the following expression (21):

$$(ddx_{ij} \leq 2) \text{ and } (ddy_{ij} \leq 2) \text{ then } pd_{ij}=1$$

$$(ddx_{ij} > 2) \text{ or } (ddy_{ij} > 2) \text{ then } pd_{ij}=0 \qquad (21)$$

It is a problem in reliability that the presence or absence of continuation is promptly decided only by the results of the judgment thus obtained, whereby the final judgment of the continuation in the current field must be made in consideration of the continuation in the preceding fields. Therefore, a weight $W_j$ of continuation indicated by the following equation (22) is used as a parameter used for the final judgment:

$$W_j = \sum_{i=1}^{N} w_i \qquad (22)$$

where N represents the number of motion vector detecting areas used at the time of detecting a scene change, and $w_i$ represents a weight in the i-th area in the j-th field and is calculated by the following expressions (23). Consequently, the weight $W_j$ of continuation represents the sum of weights in the j-th field in the respective motion vector detecting areas.

$pd_{ij} = pd_{i(j-1)} = \ldots = pd_{i(j-7)} = 1$ then $w_i = 1$ $((ddx_{ij} + ddy_{ij}) > 9)$ and $\{(pd_{ij}=0)$ and $(pd_{i(j-1)} = pd_{i(j-2)} = \ldots = pd_{i(j-7)} = 1)\}$ then $w_i = -3$ $((ddx_{ij} + ddy_{ij}) > 7)$ and $\{(pd_{ij}=0)$ and $(pd_{i(j-1)} = pd_{i(j-2)} = \ldots = pd_{i(j-7)} = 1)\}$ then $w_i = -2$ $((ddx_{ij} + ddy_{ij}) > 5)$ and $\{(pd_{ij}=0)$ and $(pd_{i(j-1)} = pd_{i(j-2)} = \ldots = pd_{i(j-7)} = 1)\}$ then $w_i = -1$ else then $w_i = 0 \qquad (23)$ In a case where the weight $W_j$ of continuation thus calculated exceeds a predetermined value, for example, N/4, it is considered that the continuation is held. When a scene change is erroneously detected in the j-th field due to flashing, the results of the detection of the scene change are rejected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting two-dimensional images into three-dimensional images by producing from a two-dimensional image signal a first image signal which forms a basis and a second image signal delayed by a predetermined number of fields from said first image signal and taking one of the signals as a left eye image signal and the other signal as a right eye image signal, comprising:

a first step of judging whether or not a scene represented by said two-dimensional image signal is changed; and a second step of taking delay indicating how many fields are there from a field corresponding to said first image signal to a field corresponding to said second image signal as a predetermined value when it is judged that the scene is changed.

2. The method according to claim 1, wherein said delay is made zero when it is judged that the scene is changed in said second step.

3. The method according to claim 1, wherein it is judged in said first step whether or not the scene is changed on the basis of a value related to a motion vector detected for each field in said two-dimensional image signal.

4. The method according to claim 3, wherein it is judged that the scene is changed when a value related to a motion vector detected in a certain field in said two-dimensional image signal is larger by not less than a predetermined value than values related to motion vectors detected in fields preceding and succeeding the certain field.

5. The method according to claim 3, wherein a plurality of motion vector detecting areas are set in one field in said two-dimensional image signal, and the sum of values related to motion vectors detected for the motion vector detecting areas in each of fields is used as a value related to said motion vector detected in the field.

6. The method according to claim 4, wherein a plurality of motion vector detecting areas are set in one field in said two-dimensional image signal, and the sum of values related to motion vectors detected for the motion vector detecting areas in each of fields is used as a value related to said motion vector detected in the field.

7. The method according to claim 3, wherein in a case where a value related to a motion vector detected in the t-th field in said two-dimensional image signal is taken as MX(t), and the average value of values related to motion vectors detected in a predetermined number of fields preceding a field which is two fields preceding the t-th field is taken as MXave(t−2), it is judged that the scene is changed in the (t−1)-th field when the following expression (1) is satisfied:

$$MX(t-1) >> MXave(t-2) \cap MX(t-1) >> MX(t) \qquad (1).$$

8. The method according to claim 7, wherein a plurality of motion vector detecting areas are set in one field in said two-dimensional image signal, and a value MX(t) related to a motion vector detected in the t-th field is represented by the following equation (2):

$$MX(t) = \sum_{i=1}^{Nx} \sum_{j=1}^{Ny} | \overrightarrow{M_{ij}(t)} \cdot \vec{ex} | \qquad (2)$$

Nx: the number of motion vector detecting areas in the transverse direction of a screen Ny: the number of motion vector detecting areas in the longitudinal direction of the screen $\overrightarrow{M_{ij}(t)}$: a motion vector in the t-th field $\vec{ex}$: a unit vector in the transverse direction.

9. The method according to claim 2, wherein in a case where a value related to a motion vector detected in a certain field in said two-dimensional image signal is larger by not less than a predetermined value than the average value of values related to motion vectors respectively detected in several fields preceding the certain field and is larger by not less than a predetermined value than a value related to a motion vector detected in a field which is one field succeeding said certain field, it is judged that the scene is changed.

10. The method according to claim 9, wherein the average value MXave(t) of values related to motion vectors respectively detected in several fields preceding the t-th field is represented by the following equation (3):

$$MXave(t) = \frac{1}{S} \cdot \sum_{k=1}^{S} MX(t+1-k) \qquad (3)$$

S: the number of fields for finding the average value

MX(t+1−k) : the sum of values related to motion vectors in the (t+1−k)-th field.

11. The method according to claim 10, wherein a plurality of motion vector detecting areas are set in one field in said two-dimensional image signal, and the sum of values related to motion vectors respectively detected for the motion vector detecting areas in each of the fields is used as a value related to the motion vector detected in the field.

12. The method according to claim 1, further comprising the step of erasing, in a case where it is judged that the scene is changed, values related to motion vectors in fields preceding a field where the scene is changed which have been stored.

13. The method according to claim 1, wherein said first step comprises the steps of finding a luminance level for each field in said two-dimensional image signal, judging whether or not the amount of the change in the luminance level between fields in said two-dimensional image signal is larger than a predetermined value, and judging that the scene is changed when it is judged that the amount of the change in the luminance level between the fields is larger than the predetermined value.

14. The method according to claim 1, wherein said first step comprises the steps of finding a chrominance level for each field in said two-dimensional image signal, judging whether or not the amount of the change in the chrominance level between fields in said two-dimensional image signal is larger than a predetermined value, and judging that the scene is changed when it is judged that the amount of the change in the chrominance level between the fields is larger than the predetermined value.

15. The method according to claim 1, wherein said first step comprises the steps of counting the number of horizontal synchronizing signals included in said two-dimensional image signal every time a vertical synchronizing signal is extracted from said two-dimensional image signal until the succeeding vertical synchronizing signal is extracted, judging whether or not asynchronization occurs in said two-dimensional image signal on the basis of the number of horizontal synchronizing signals obtained, and judging that the scene is changed when it is judged that asynchronization occurs in said two-dimensional image signal.

16. The method according to claim 1, wherein said two-dimensional image signal is a television broadcasting signal, and said first step is the step of judging that the scene is changed when a channel switching signal produced when a television channel is switched is detected.

17. The method according to claim 1, wherein said first step is the step of judging that the scene is changed when a source switching signal produced when a source of said two-dimensional image signal is switched is detected.

18. The method according to claim 1, wherein said two-dimensional image signal is a telecine converted image signal, and said first step is the step of judging whether or not the scene is changed on the basis of a value related to a motion vector detected for each field in the telecine converted image signal.

19. The method according to claim 18, wherein it is judged whether or not the scene is changed on the basis of a value related to a motion vector detected in a field where a frame of a cinema film (hereinafter referred to as a frame) is changed in the telecine converted image signal.

20. The method according to claim 19, wherein in a case where a value related to a motion vector detected in a predetermined field where a frame is changed in the telecine converted image signal is larger by not less than a predetermined value than a value related to a motion vector detected in a field where a frame which is one frame preceding the frame changed in the predetermined field is changed, it is judged that the scene is changed in said predetermined field.

21. The method according to claim 20, wherein a value related to a motion vector is the minimum value of accumulated correlation values obtained at the time of detecting a motion vector by a representative point matching method.

22. The method according to claim 19, wherein in a case where a value related to a motion vector detected in a predetermined field where a frame is changed in the telecine converted image signal is larger by not less than a predetermined value than a value related to a motion vector detected in a field where a frame which is one frame preceding the frame changed in the predetermined field is changed and a value related to a motion vector detected in a field where a frame which is two frames preceding the frame changed in the predetermined field is changed, it is judged that the scene is changed in said predetermined field.

23. The method according to claim 22, wherein a value related to a motion vector is the minimum value of accumulated correlation values obtained at the time of detecting a motion vector by a representative point matching method.

24. The method according to claim 19, wherein in a case where a value related to a motion vector detected in a predetermined field where a frame is changed in the telecine converted image signal is larger by not less than a predetermined value than a value related to a motion vector detected in a field where a frame which is one frame preceding the frame changed in the predetermined field is changed and a value related to a motion vector detected in a field where a frame which is two frames preceding the frame changed in the predetermined field is changed, and the absolute value of the difference between the value related to the motion vector detected in said predetermined field where the frame is changed and the value related to the motion vector detected in the field where the frame which is one frame preceding the frame changed in the predetermined field is changed is not less than the absolute value of the difference between the value related to the motion vector detected in the field where the frame which is one frame preceding the frame changed in the predetermined field is changed and the value related to the motion vector detected in the field where the frame which is two frames preceding the frame changed in the predetermined field is changed, it is judged that the scene is changed in said predetermined field.

25. The method according to claim 24, wherein a value related to a motion vector is the minimum value of accumulated correlation values obtained when a motion vector is detected by a representative point matching method.

26. The method according to claim 18, wherein said first step comprises the steps of judging, in a case where a value related to a motion vector detected in a first predetermined field where a frame is changed in the telecine converted image signal is larger by not less than a predetermined value than a value related to a motion vector detected in a field where a frame which is one frame preceding the frame changed in the first predetermined field is changed, that the scene is changed in said first predetermined field, and judging, when in a case where a value related to a motion vector detected in a second predetermined field which is one field preceding the current field in the telecine converted image signal is larger by not less than a predetermined value than a value related to a motion vector detected in said current field and is larger by not less than a predetermined value than a value related to a motion vector detected in a field which is one field preceding said second predetermined field, the value related to the motion vector detected in said second predetermined field is larger by not less than a predetermined value than a value related to a motion vector detected in each of fields succeeding the second predetermined field over fields up to a field where a frame is thereafter changed in the telecine converted image signal, that the scene is changed in said second predetermined field.

27. The method according to claim 26, wherein a value related to a motion vector is the minimum value of accumulated correlation values obtained at the time of detecting a motion vector by a representative point matching method.

28. The method according to claim 18, further comprising the steps of judging, in a case where a value related to a motion vector detected in a first predetermined field where a frame is changed in the telecine converted image signal is larger by not less than a predetermined value than a value related to a motion vector detected in a field where a frame which is one frame preceding the frame changed in the first predetermined field is changed and a value related to a motion vector detected in a field where a frame which is two frames preceding the frame changed in the first predetermined field is changed, that the scene is changed in said first predetermined field, and judging, when in a case where a value related to a motion vector detected in a second predetermined field which is one field preceding the current field in the telecine converted image signal is larger by not less than a predetermined value than a value related to a motion vector detected in said current field and is larger by not less than a predetermined value than a value related to a motion vector detected in a field which is one field preceding said second predetermined field, the value related to the motion vector detected in said second predetermined field is larger by not less than a predetermined value than a value related to a motion vector detected in each of fields succeeding the second predetermined field over fields up to a field where a frame is thereafter changed in the telecine converted image signal, that the scene is changed in said second predetermined field.

29. The method according to claim 28, wherein a value related to a motion vector is the minimum value of accumulated correlation values obtained at the time of detecting a motion vector by a representative point matching method.

30. The method according to claim 18, wherein said first step comprises judging, in a case where a value related to a motion vector detected in a first predetermined field where a frame is changed in the telecine converted image signal is larger by not less than a predetermined value than a value related to a motion vector detected in a field where a frame which is one frame preceding the frame changed in the first predetermined field is changed and a value related to a motion vector detected in a field where a frame which is two frames preceding the frame changed in the first predetermined field is changed, and the absolute value of the difference between the value related to the motion vector detected in said first predetermined field where the frame is changed and the value related to the motion vector detected in the field where the frame which is one frame preceding the frame changed in the first predetermined field is changed is not less than the absolute value of the difference between the value related to the motion vector detected in the field where the frame which is one frame preceding the frame changed in the first predetermined field is changed and the value related to the motion vector detected in the field where the frame which is two frames preceding the frame changed in the first predetermined field is changed, it is judged that the scene is changed in said first predetermined field, and judging, when in a case where a value related to a motion vector detected in a second predetermined field which is one field preceding the current field in the telecine converted image signal is larger by not less than a predetermined value than a value related to a motion vector detected in said current field and is larger by not less than a predetermined value than a value related to a motion vector detected in a field which is one field preceding said second predetermined field, the value related to the motion vector detected in said second predetermined field is larger by not less than a predetermined value than a value related to a motion vector detected in each of fields succeeding the second predetermined field over fields up to a field where a frame is thereafter changed in the telecine converted image signal, that the scene is changed in said second predetermined field.

31. The method according to claim 28, wherein a value related to a motion vector is the minimum value of accumulated correlation values obtained at the time of detecting a motion vector by a representative point matching method.

\* \* \* \* \*